US012602278B2

(12) United States Patent
Hasegawa et al.

(10) Patent No.: US 12,602,278 B2
(45) Date of Patent: Apr. 14, 2026

(54) ABNORMALITY DETERMINATION SYSTEM, ABNORMALITY DETERMINATION METHOD, AND PROGRAM

(71) Applicant: RAKUTEN GROUP, INC., Tokyo (JP)

(72) Inventors: Daichi Hasegawa, Tokyo (JP); Ryo Nishimura, Tokyo (JP); Taisuke Fujii, Tokyo (JP); Kengo Fujioka, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 18/700,277

(22) PCT Filed: Jan. 24, 2023

(86) PCT No.: PCT/JP2023/002139
§ 371 (c)(1),
(2) Date: Apr. 11, 2024

(87) PCT Pub. No.: WO2024/157362
PCT Pub. Date: Aug. 2, 2024

(65) Prior Publication Data
US 2025/0225019 A1     Jul. 10, 2025

(51) Int. Cl.
*G06F 11/07*     (2006.01)

(52) U.S. Cl.
CPC ........ *G06F 11/079* (2013.01); *G06F 11/0709* (2013.01)

(58) Field of Classification Search
CPC . G06F 11/0709; G06F 11/079; G06F 11/0793
See application file for complete search history.

(56) References Cited

U.S. PATENT DOCUMENTS

| | | | |
|---|---|---|---|
| 8,098,585 B2 * | 1/2012 | Jiang ................... | G06F 11/0781 |
| | | | 370/241 |
| 9,658,778 B2 * | 5/2017 | Faulkner ............... | G06F 3/0617 |
| 9,942,117 B1 | 4/2018 | Saini et al. | |
| 10,785,105 B1 * | 9/2020 | Rathinasabapathy ... | H04L 67/10 |

(Continued)

FOREIGN PATENT DOCUMENTS

| | | |
|---|---|---|
| CN | 113572625 A | 10/2021 |
| JP | 2011-154483 A | 8/2011 |

(Continued)

OTHER PUBLICATIONS

International Search Report of Apr. 11, 2023, for International Application No. PCT/JP2023/002139, pp. 1-9 (See the transmittal letter).

(Continued)

*Primary Examiner* — Joseph R Kudirka
(74) *Attorney, Agent, or Firm* — HEA Law PLLC

(57) ABSTRACT
An abnormality determination system, comprising at least one processor configured to: acquire an index usable in abnormality determination about an occurrence of abnormality in a service providing system for providing a predetermined service; acquire plan data about a plan of the predetermined service; and execute the abnormality determination based on the index and the plan data.

12 Claims, 14 Drawing Sheets

(56)     References Cited

U.S. PATENT DOCUMENTS

| | | | |
|---|---|---|---|
| 11,163,663 B2 * | 11/2021 | Chellappan | ............ G06N 20/00 |
| 2011/0185235 A1 | 7/2011 | Iizuka | |
| 2019/0129813 A1 | 5/2019 | Sankarasubramanian et al. | |
| 2020/0371858 A1 * | 11/2020 | Hayakawa | .......... G06F 11/0793 |
| 2020/0371892 A1 | 11/2020 | Huang et al. | |
| 2021/0278832 A1 | 9/2021 | Koumoto et al. | |
| 2021/0382992 A1 * | 12/2021 | Massiglia | ............... G06F 21/64 |
| 2022/0237099 A1 | 7/2022 | Shiraishi et al. | |
| 2022/0269577 A1 | 8/2022 | Gechman et al. | |

FOREIGN PATENT DOCUMENTS

| | | |
|---|---|---|
| JP | 2017-033275 A | 2/2017 |
| JP | 2022-067897 A | 5/2022 |
| WO | 2010/001966 A1 | 1/2010 |

OTHER PUBLICATIONS

International Search Report of Apr. 11, 2023, for International Application No. PCT/JP2023/002138, pp. 1-9 (See the transmittal letter).
Partial Search Report of Dec. 13, 2024, for related EP Patent Application No. 23866630.9, pp. 1-20.
Search Report of Dec. 12, 2024, for corresponding EP Patent Application No. 23864115.3, pp. 1-9.
Office Action of Dec. 17, 2025, for related U.S. Appl. No. 18/700,273, pp. 1-30.
Office Action of Dec. 13, 2025, for corresponding SG Patent Application No. 11202401675P, pp. 1-14.

* cited by examiner

FIG.3

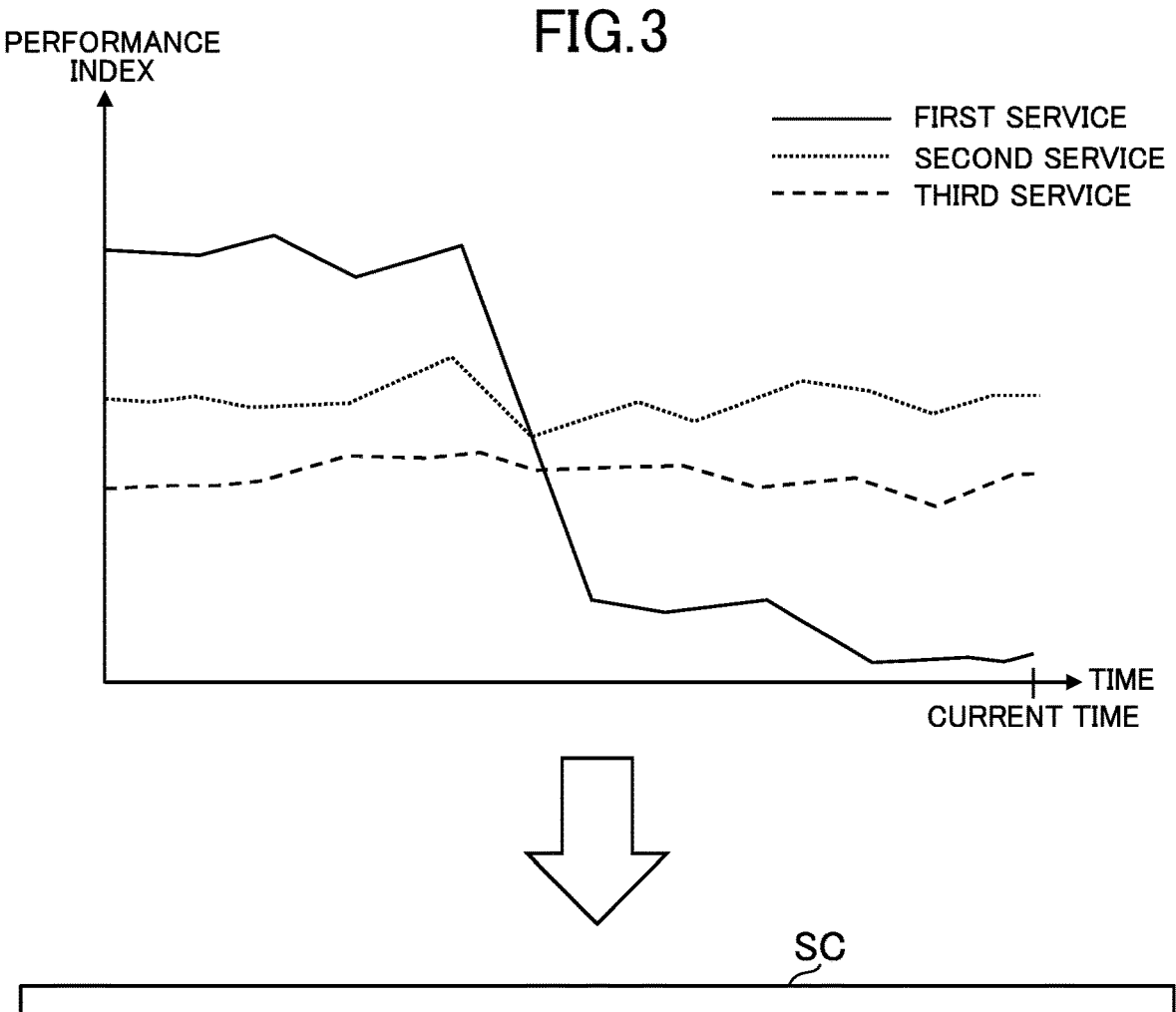

PERFORMANCE INDEX

FIRST SERVICE
SECOND SERVICE
THIRD SERVICE

TIME
CURRENT TIME

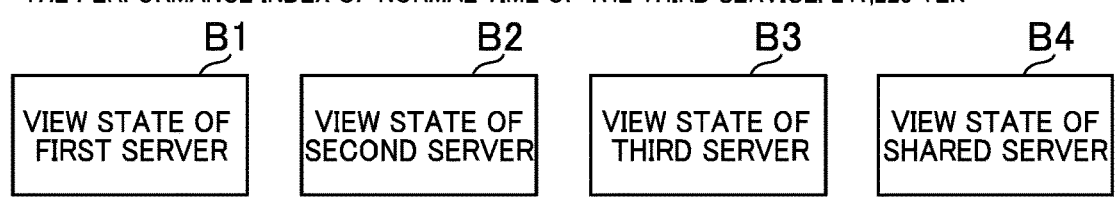

SC

ADMINISTRATOR SCREEN

THE PERFORMANCE INDEX OF THE FIRST SERVICE HAS DROPPED UNNATURALLY.
CHECK THE STATE OF THE FIRST SERVER.

THE PERFORMANCE INDEX OF THE CURRENT TIME OF THE FIRST SERVICE: 32,154 YEN
THE PERFORMANCE INDEX OF NORMAL TIME OF THE FIRST SERVICE: 418,020 YEN

THE PERFORMANCE INDEX OF THE CURRENT TIME OF THE SECOND SERVICE: 182,450 YEN
THE PERFORMANCE INDEX OF NORMAL TIME OF THE SECOND SERVICE: 161,420 YEN

THE PERFORMANCE INDEX OF THE CURRENT TIME OF THE THIRD SERVICE: 270,827 YEN
THE PERFORMANCE INDEX OF NORMAL TIME OF THE THIRD SERVICE: 241,225 YEN

B1

VIEW STATE OF
FIRST SERVER

B2

VIEW STATE OF
SECOND SERVER

B3

VIEW STATE OF
THIRD SERVER

B4

VIEW STATE OF
SHARED SERVER

| SERVICE ID | ABNORMALITY DETERMINATION EXECUTION DATE AND TIME | PERFORMANCE INDEX | ABNORMALITY DETERMINATION EXECUTION RESULT |
|---|---|---|---|
| s00001 | 2022/12/1 12:00:00 | 420,000 YEN | NORMAL |
|  | 2022/12/1 12:01:00 | 393,031 YEN | NORMAL |
|  | 2022/12/1 12:02:00 | 48,879 YEN | ABNORMAL |
|  | . . . | . . . | . . . |
| s00002 | 2022/12/1 12:00:00 | 179,032 YEN | NORMAL |
|  | 2022/12/1 12:01:00 | 163,022 YEN | NORMAL |
|  | 2022/12/1 12:02:00 | 172,892 YEN | NORMAL |
|  | . . . | . . . | . . . |
| s00003 | 2022/12/1 12:00:00 | 259,954 YEN | NORMAL |
|  | 2022/12/1 12:01:00 | 248,291 YEN | NORMAL |
|  | 2022/12/1 12:02:00 | 221,192 YEN | NORMAL |
|  | . . . | . . . | . . . |

| DATE AND TIME OF PLAN | NAME OF PLAN | CONTENTS OF PLAN |
|---|---|---|
| 2022/12/10 00:00:00 ~2022/12/20 23:59:59 | YEAR-END SALE | FIRST SERVICE $\frac{\text{NORMAL TIME PAYMENT}}{\text{TRANSACTION COUNT}} \times 2 \cdots$ |
| 2022/12/23 00:00:00 ~2022/12/31 23:59:59 | BONUS POINT CAMPAIGN | SECOND SERVICE $\frac{\text{NORMAL TIME PAYMENT}}{\text{TRANSACTION COUNT}} \times 1.2 \cdots$ |
| 2022/12/23 10:00:00 ~2022/12/25 12:00:00 | FRIEND REFERRAL CAMPAIGN | THIRD SERVICE  ACCESS COUNT $\times 1.3 \cdots$ |
| . . . | . . . | . . . |

| NAME OF PLAN | ABNORMALITY DETERMINATION CRITERION |
|---|---|
| YEAR-END SALE | 300,000 YEN |
| BONUS POINT CAMPAIGN | 120,000 YEN |
| FRIEND REFERRAL CAMPAIGN | 100,000 YEN |
| . . . | . . . |

FIG.12
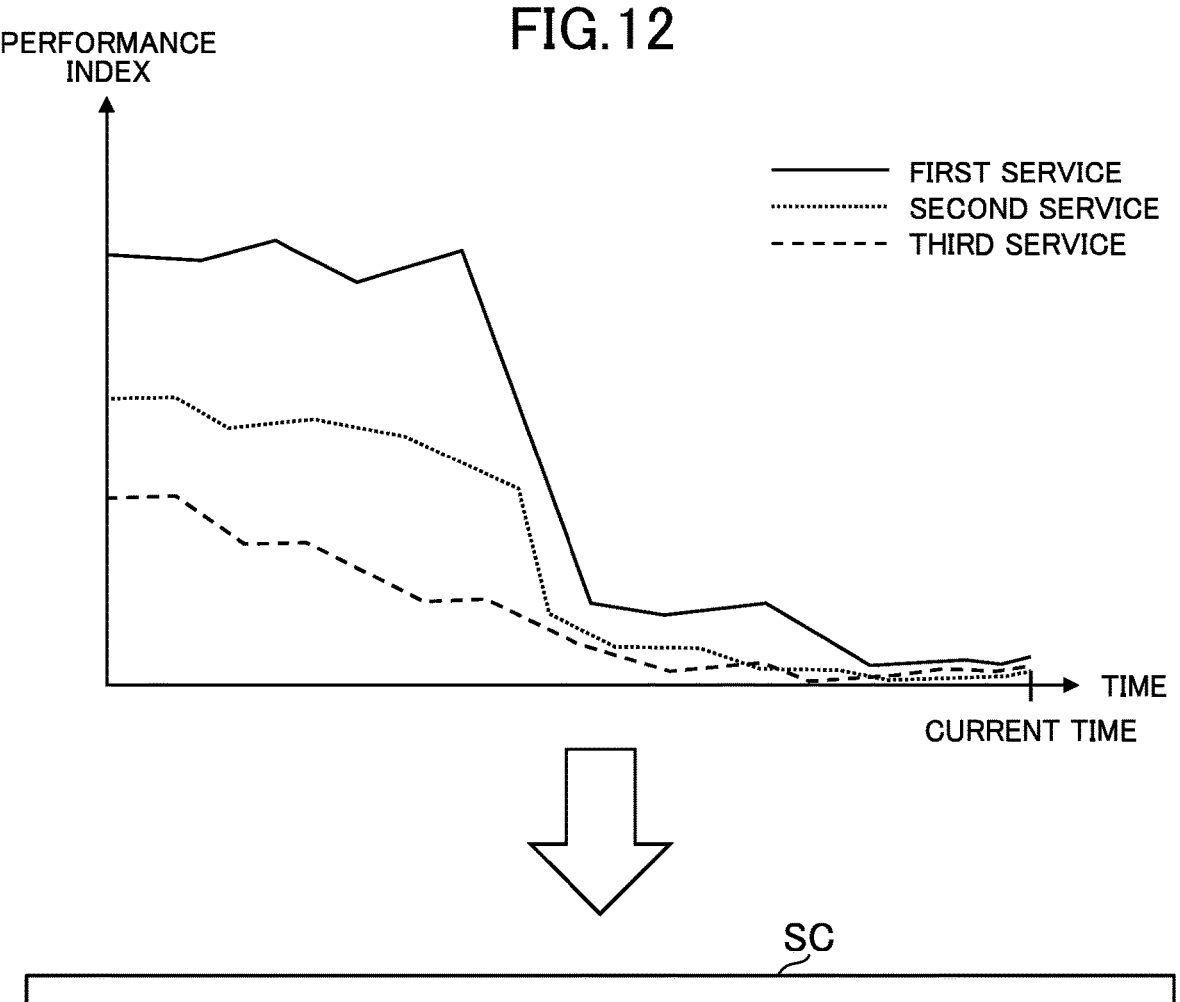
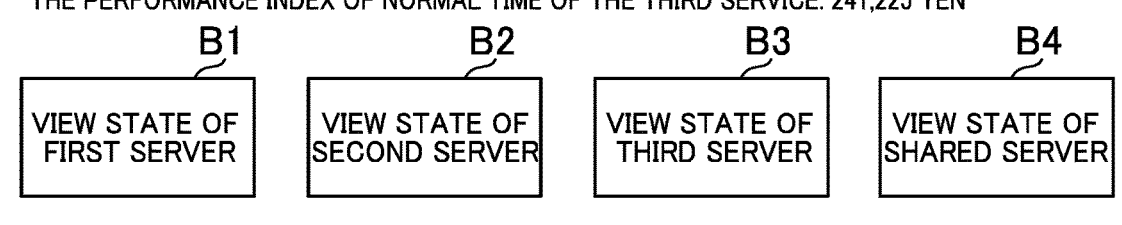

FIG.13

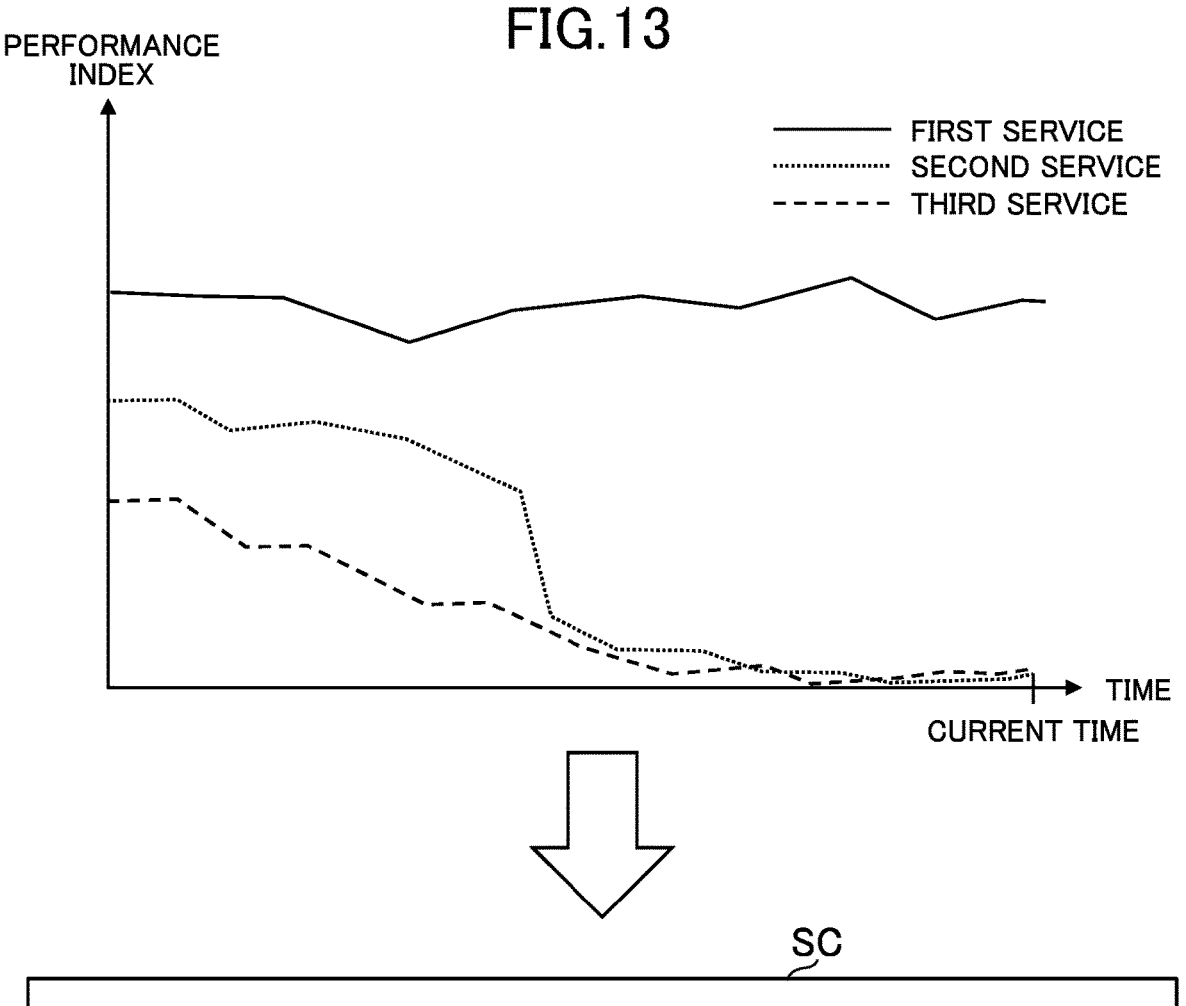

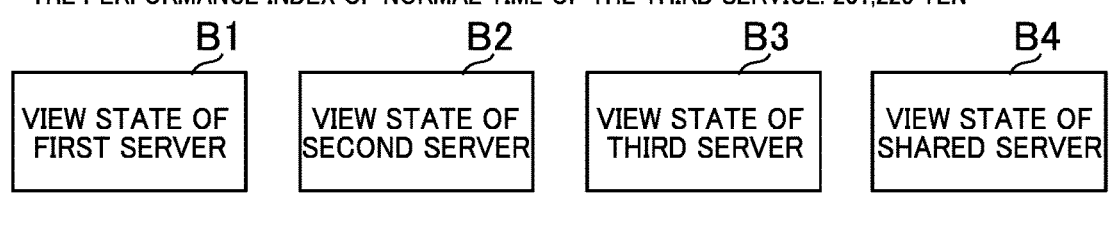

SC

ADMINISTRATOR SCREEN

THE PERFORMANCE INDICES OF THE SECOND SERVICE AND THE THIRD
SERVICE HAVE DROPPED UNNATURALLY.
CHECK THE STATE OF THE SHARED PLATFORM OF THE SHARED SERVER.

THE PERFORMANCE INDEX OF THE CURRENT TIME OF THE FIRST SERVICE: 302,154 YEN
THE PERFORMANCE INDEX OF NORMAL TIME OF THE FIRST SERVICE: 318,020 YEN

THE PERFORMANCE INDEX OF THE CURRENT TIME OF THE SECOND SERVICE: 12,450 YEN
THE PERFORMANCE INDEX OF NORMAL TIME OF THE SECOND SERVICE: 261,420 YEN

THE PERFORMANCE INDEX OF THE CURRENT TIME OF THE THIRD SERVICE: 20,827 YEN
THE PERFORMANCE INDEX OF NORMAL TIME OF THE THIRD SERVICE: 201,225 YEN

| B1 | B2 | B3 | B4 |
|---|---|---|---|
| VIEW STATE OF FIRST SERVER | VIEW STATE OF SECOND SERVER | VIEW STATE OF THIRD SERVER | VIEW STATE OF SHARED SERVER |

ABNORMALITY DETERMINATION SYSTEM, ABNORMALITY DETERMINATION METHOD, AND PROGRAM

CROSS REFERENCE TO RELATED APPLICATIONS

This application is a National Stage of International Application No. PCT/JP2023/002139 filed on Jan. 24, 2023. The contents of the above document are incorporated herein by reference in its entirety.

TECHNICAL FIELD

The present disclosure relates to an abnormality determination system, an abnormality determination method, and a program.

BACKGROUND ART

There has been known a technology for executing abnormality determination with regard to an occurrence of abnormality in a system. In Patent Literature 1, for example, there is described a technology for determining, based on a load related to a computer in a service providing system which provides a predetermined service, whether the computer is in abnormal operation state. With the technology of Patent Literature 1, when it is determined that the computer is in abnormal operation state, the abnormality is notified to an administrator based on a response time which is a time required for the computer to respond to a predetermined command.

CITATION LIST

Patent Literature

[PTL 1] JP 2011-154483 A

SUMMARY OF INVENTION

Technical Problem

In Patent Literature 1, there is also described determining an abnormality determination criterion based on a trend of the load on a computer. However, when some plan is scheduled in a service that uses a computer, an optimum abnormality determination criterion may vary depending on the plan. With the technology of Patent Literature 1, the abnormality determination criterion is determined based on a real-time trend, and consequently, a flexible abnormality determination criterion fit to the plan cannot be set. The same applies to technologies other than the technology of Patent Literature 1. The related art thus falls short of raising flexibility of abnormality determination to a satisfactory level.

One object of the present disclosure is to raise flexibility of abnormality determination.

Solution to Problem

According to one embodiment of the present disclosure, there is provided an abnormality determination system including: an index acquisition module configured to acquire an index usable in abnormality determination about an occurrence of abnormality in a service providing system for providing a predetermined service; a plan data acquisition module configured to acquire plan data about a plan of the predetermined service; and an abnormality determination module configured to execute the abnormality determination based on the index and the plan data.

Advantageous Effects of Invention

According to the present disclosure, the flexibility of abnormality determination is raised.

BRIEF DESCRIPTION OF DRAWINGS

FIG. 3 is a diagram for illustrating an example of a performance index used in abnormality determination.

FIG. 5 is a table for showing an example of a performance index database.

FIG. 9 is a table for showing an example of a plan database.

FIG. 10 is a table for showing an example of an abnormality determination criterion database.

FIG. 12 is a diagram for illustrating an example of abnormality determination based on an overall performance index of a plurality of services.

FIG. 13 is a diagram for illustrating an example of abnormality determination based on a relationship between a performance index of one service and a performance index of another service.

DESCRIPTION OF EMBODIMENTS

1. First Embodiment

A first embodiment, which is an example of an embodiment of an abnormality determination system according to the present disclosure, is described.

1-1. Overall Configuration of Abnormality Determination System

Figure 1:
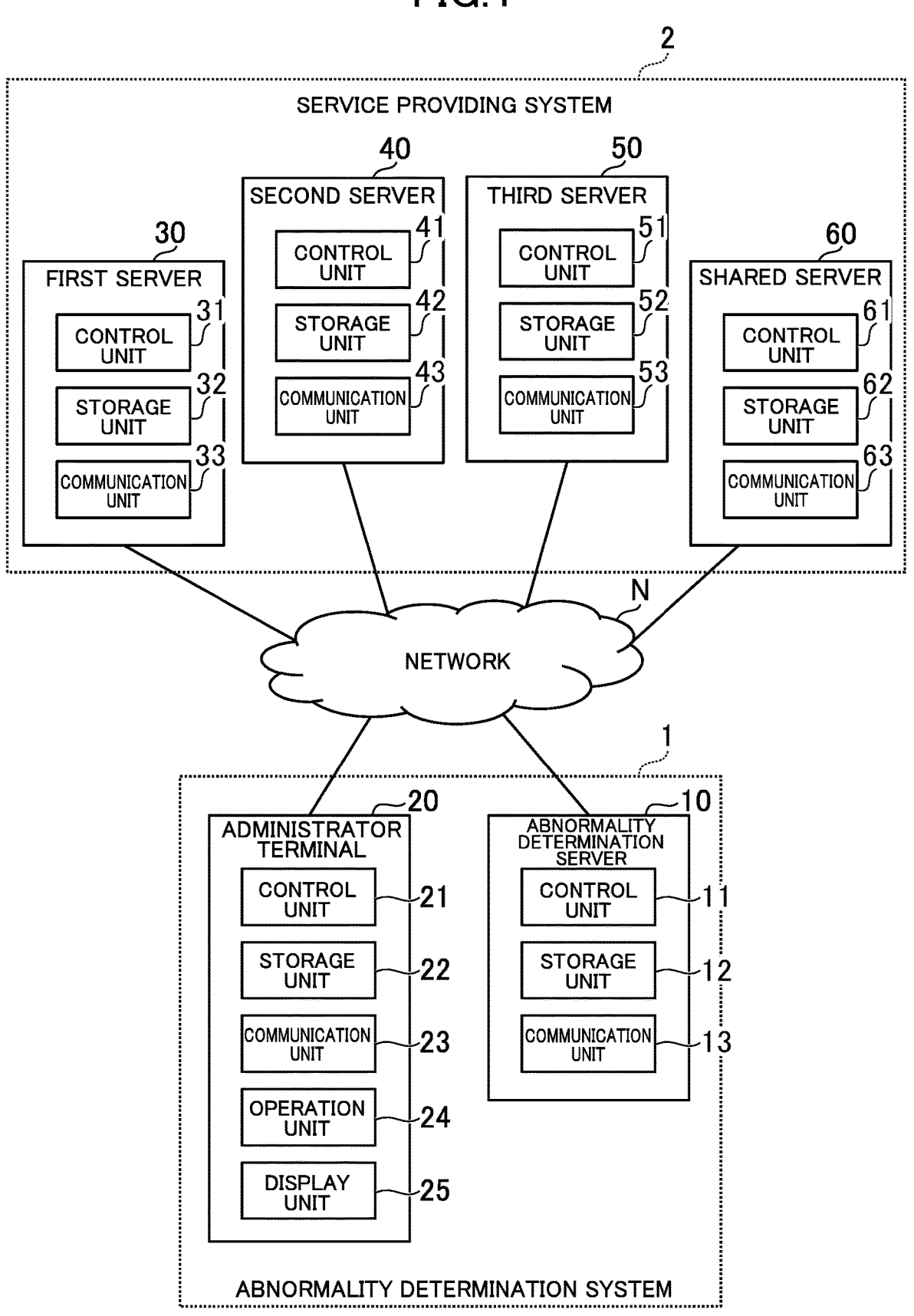
FIG. 1 is a diagram for illustrating an example of an overall configuration of an abnormality determination system.

FIG. 1 is a diagram for illustrating an example of an overall configuration of the abnormality determination system. For example, an abnormality determination system 1 is connectable to a network N which is the Internet, a LAN, or the like. A service providing system 2 is connectable to the network N as well. Another system or a terminal may be connectable to the network N. In FIG. 1, an example in which the abnormality determination system 1 and the service providing system 2 are connected to each other via the network N is illustrated. However, the abnormality determination system 1 may be included in the service providing system 2. In this case, administrator rights of the abnormality determination system 1 are included in administrator rights of the service providing system 2.

For example, the abnormality determination system 1 includes an abnormality determination server 10 and an administrator terminal 20. The abnormality determination server 10 is a server computer. For example, the abnormality determination server 10 includes a control unit 11, a storage unit 12, and a communication unit 13. The control unit 11 includes at least one processor. The storage unit 12 includes a volatile memory such as a RAM, and a non-volatile memory such as a flash memory. The communication unit 13 includes at least one of a communication interface for wired communication or a communication interface for wireless communication.

The administrator terminal 20 is a computer of an administrator who manages the abnormality determination system 1. For example, the administrator terminal 20 is a personal computer, a tablet terminal, or a smartphone. For example, the administrator terminal 20 includes a control unit 21, a storage unit 22, a communication unit 23, an operation unit 24, and a display unit 25. Hardware configurations of the control unit 21, the storage unit 22, and the communication unit 23 may be the same as the hardware configurations of the control unit 11, the storage unit 12, and the communication unit 13, respectively. The operation unit 24 is an input device, such as a touch panel or a mouse. The display unit 25 is a display, such as a liquid crystal display or an organic EL display.

For example, the service providing system 2 includes a first server 30, a second server 40, a third server 50, and a shared server 60. The first server 30, the second server 40, the third server 50, and the shared server 60 each have the same hardware configuration as the hardware configuration of the abnormality determination server 10. For example, hardware configurations of control units 31, 41, 51, and 61, storage units 32, 42, 52, and 62, and communication units 33, 43, 53, and 63 are the same as the hardware configurations of the control unit 11, the storage unit 12, and the communication unit 13, respectively. The service providing system 2 can be read as a tenant in a cloud infrastructure or a cloud platform, and is configured from a plurality of offering services selected from a group of offering services including software configurations or hardware configurations of the abnormality determination system 1 and others.

Programs stored in the storage units 12, 22, 32, 42, 52, and 62 may be supplied via the network N. Each of the computers may include at least one of a reading unit (for example, a memory card slot) for reading a computer-readable information storage medium or an input and output unit (for example, a USB port) for inputting data from and outputting data to an external device. For example, a program stored in an information storage medium may be supplied via at least one of the reading unit or the input and output unit.

It is sufficient for the abnormality determination system 1 to include at least one computer, and the abnormality determination system 1 is not limited to the example of FIG. 1. For instance, the abnormality determination system 1 may be designed so as to include the abnormality determination server 10 alone without the administrator terminal 20. The abnormality determination system 1 may be designed so as to include the administrator terminal 20 alone without the abnormality determination server 10. The abnormality determination system 1 may include a computer other than the abnormality determination server 10 and the administrator terminal 20.

1-2. Outline of First Embodiment

For example, the service providing system 2 provides at least one service to users. In the first embodiment, three services which are a first service, a second service, and a third service are taken as an example. However, the service providing system 2 may provide one service, two services, or four or more services to users. The first server 30 is a server computer of the first service. The second server 40 is a server computer of the second service. The third server 50 is a server computer of the third service.

In the first embodiment, a case in which the first service is an electronic commerce transaction service, the second service is a payment service, and the third service is a financial service is taken as an example. However, the service providing system 2 can provide any service to users. Services provided by the service providing system 2 to users are not limited to the example of the first embodiment. For instance, the service providing system 2 may provide a communications service, a travel reservation service, a video distribution service, an insurance service, a ticket reservation service, or other services to users.

For example, the service providing system 2 may be designed so that reward points common to a plurality of services provided by the service providing system 2 are usable. Reward points earned by using one service may be redeemable in not only this service but also other services. The service providing system 2 may provide a plurality of services among which reward points earned by a user are usable in a circulatory manner. The service providing system 2 may be designed so that the same business operator provides a plurality of services, or so that a plurality of services are provided by different business operators.

For instance, instead of one service providing system 2 providing a plurality of services, a plurality of service providing systems each of which is the service providing system 2 may provide a plurality of services. A plurality of service providing systems each of which is the service providing system 2 may operate together to provide one service. The service providing system 2 and services may have any one of a one-to-one relationship, a one-to-many relationship, a many-to-one relationship, and a many-to-many relationship. It is sufficient for the service providing system 2 to include at least one computer, and the service providing system 2 is not limited to the example of FIG. 1. The service providing system 2 may include a plurality of computers. Any number of service providing systems each of which is the service providing system 2 may be included.

The abnormality determination system 1 executes abnormality determination in the service providing system 2. The abnormality determination is determination about an occurrence of abnormality in the service providing system 2. For example, to determine whether abnormality has occurred or to calculate an abnormality score indicating the degree of abnormality corresponds to the abnormality determination. The abnormality score may be expressed in numerical values, characters, or other symbols. In a case in which the abnormality score is a numerical value, for example, a higher abnormality score may indicate a higher degree of abnormality. Conversely, a lower abnormality score may indicate a higher degree of abnormality.

Abnormality in the service providing system 2 means abnormality of at least one of hardware or software included in the service providing system 2. Abnormality in the service providing system 2 may mean both of abnormality of hardware and abnormality of software, or may mean abnormality of hardware alone or abnormality of software alone. Abnormality can be rephrased as a state that is not normal. For example, an occurrence of a failure, or a state that is not quite a failure but calls for attention, corresponds to abnormality.

For example, the abnormality determination system 1 performs the abnormality determination on hardware included in the service providing system 2. The hardware that is a target of the abnormality determination may be of any type. For example, the hardware that is a target of the abnormality determination may be a server computer, a personal computer, a tablet computer, a smartphone, a network device, a network cable, an information storage medium, a battery, a power supply cord, a sensor, a camera, a card reader, a reader/writer, a display, a printer, or other peripheral devices, or a combination thereof. For example, an increase in load on hardware, a failure of hardware, unintended operation of hardware, hardware failing to operate, hardware failing to hold communication to and from an external device, or hardware powering off at an unintended time corresponds to abnormality.

For example, the abnormality determination system 1 performs the abnormality determination on software included in the service providing system 2. The software that is a target of the abnormality determination may be of any type. For example, the software that is a target of the abnormality determination is an operating system, a program for executing payment, a program for receiving an order for an article of commerce, a program for receiving a reservation for a facility, a program for receiving a reservation for a ticket, a program for receiving registration of a membership of a service, other programs executed to provide the service, a program that refers to a database, or an API, or a combination thereof. For example, software operation taking longer than normal, software ceasing to operate, software failing to shut down, software experiencing other errors, software failing to activate, or a failure to update a database corresponds to abnormality.

Figure 2:
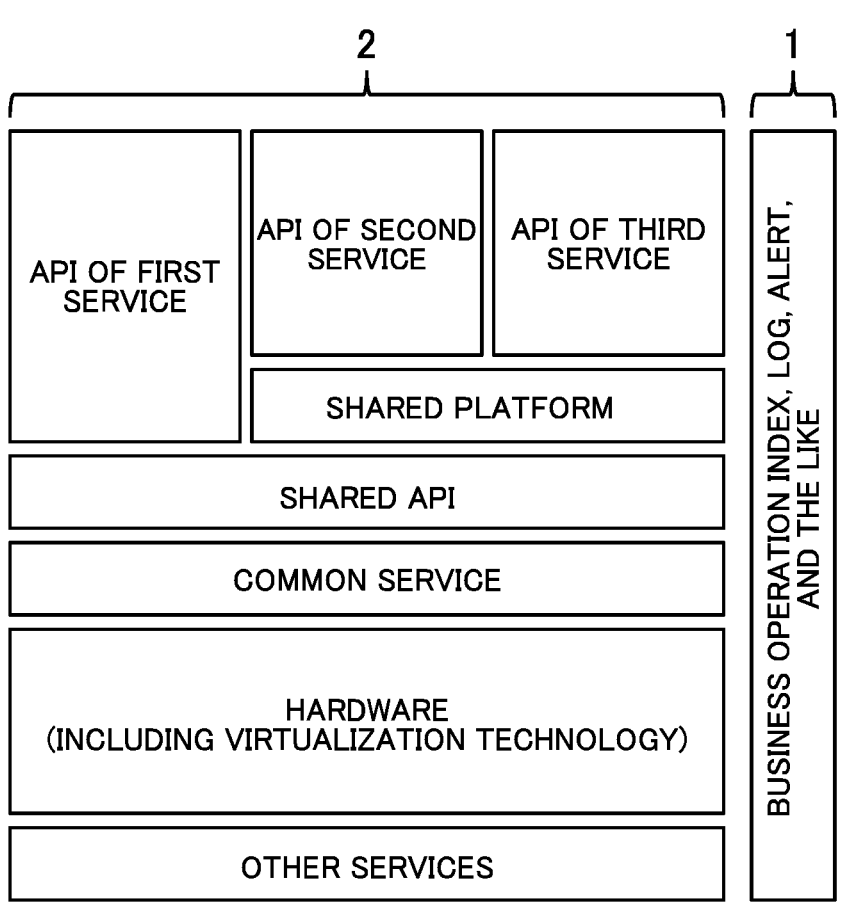
FIG. 2 is a diagram for illustrating an example of a concept of the abnormality determination system and a service providing system.

FIG. 2 is a diagram for illustrating an example of a concept of the abnormality determination system 1 and the service providing system 2. Although a plurality of services are each provided to users by various types of hardware (including virtual hardware) and software included in the abnormality determination system 1 and the service providing system 2 in actuality, as a concept, various services are provided to users by a single system obtained by cloud integration. Accordingly, a single cloud system including the abnormality determination system 1 and the service providing system 2 conceptually provides various services to users.

For example, the service providing system 2 includes an API of the first service implemented by the first server 30, an API of the second service implemented by the second server 40, and an API of the third service implemented by the third server 50. In the first embodiment, the second service, which is a payment service, and the third service, which is a financial service, are similar to each other in that the services are both fintech services, and accordingly use a shared platform. The platform is at least one of hardware or software included in the shared server 60.

For example, the first service, the second service, and the third service use a shared API shared with one another. For example, the shared API may be an API for enabling use of reward points common to the first service, the second service, and the third service. This API is implemented by the shared server 60. For example, a common service provided by the shared API may be a service for enabling use of reward points common to the first service, the second service, and the third service. The common service is provided by the shared server 60. The service providing system 2 may include a component for providing another service, and may include various layers such as a physical layer for controlling communication of the service providing system 2.

Examples of the hardware included in the service providing system 2 are the first server 30, the second server 40, the third server 50, and the shared server 60. Any piece of hardware usable to provide a service suffices, and the hardware is not limited to a server computer. For example, the hardware may include another piece of hardware such as the network device mentioned above. The hardware is not limited to a physical component and may mean a virtual component. For example, a definition of the hardware may include container or virtual machine. Those virtual components may be classified as software instead of hardware.

The related art that uses at least one of latency, error, traffic, or saturation as an index to be used in the abnormality determination of the service providing system 2 has been known. The latency is a processing time (response time) to process a request for a service. The error is the number of errors returned in response to requests. The traffic is a use amount (for example, the number of requests) of a service per unit time. The saturation is the degree of consumption of resources in the service providing system 2. Those four indices are also referred to as "golden signal metrics."

In the first embodiment, the abnormality determination system 1 acquires a performance index about performance of a service in order to execute the abnormality determination with regard to an occurrence of abnormality in the service providing system 2. The performance index is an index for evaluating performance from a business perspective. The performance index is also referred to as "performance indicator" or "key performance indicator." The performance index is, for example, the number of payment transactions, a payment amount, the number of orders, the number of uses, the number of new users, the number of active users, an access count, or a login count, or a combination thereof. As illustrated in FIG. 2, the abnormality determination system 1 may acquire a log in a service or alert an administrator.

FIG. 3 is a diagram for illustrating an example of the performance index used in the abnormality determination. An axis of ordinate of FIG. 3 is an axis indicating the performance index. An axis of abscissa of FIG. 3 is an axis indicating time. In FIG. 3, a case in which an overall payment amount of a service per unit time corresponds to the performance index is taken as an example. The per-unit time is 1 minute in the first embodiment, but is only required to have a length determined in advance, and is not limited to the example of the first embodiment. For instance, the per-unit time may be less than 1 minute, a few minutes to 1 hour, a few hours to 1 day, or other lengths of time. The per-unit time may be specified by the administrator, or may vary from one service to another service.

In the example of FIG. 3, a current time on the axis of abscissa means the immediate past 1 minute. Changes in time series of the performance index of the first service are indicated by the solid line. Changes in time series of the performance index of the second service are indicated by the dotted line. Changes in time series of the performance index of the third service are indicated by the broken line. For example, the abnormality determination server 10 holds communication to and from each of the first server 30, the second server 40, and the third server 50 for each unit time, to thereby acquire the respective performance indices of the first service, the second service, and the third service.

In the example in an upper part of FIG. 3, the performance index of the first service rapidly drops at a point that precedes the current time a little, and shifts at a low level. The performance index of the second service and the performance index of the third service, on the other hand, maintain stable values with no significant changes. In this case, only the performance index of the first service rapidly drops, and there is accordingly a possibility that the first service alone is having a difficulty in receiving payment transactions. For example, abnormality is possibly occurring only on the first server 30, with the second server 40 and the third server 50 being free of abnormality.

In this case, as illustrated in a lower part of FIG. 3, the display unit 25 of the administrator terminal 20 displays an administrator screen SC that indicates the possibility of abnormality occurring in the first service. The administrator screen SC displays the performance index of the current time and the performance index of normal time for each of the first service, the second service, and the third service. The performance index of normal time is a performance index that serves as a criterion for the abnormality determination. The performance index of normal time is, for example, an average value of the performance index in a past fixed period, the performance index in the same period of the past, or a value manually set by the administrator.

For example, it is determined that abnormality has occurred when a difference between the performance index of the current time and the performance index of normal time becomes equal to or more than a threshold value. The performance index of normal time may be calculated from past performance, or may be specified by the administrator. In the example of FIG. 3, the performance index of the current time rapidly drops in the first service alone, and the administrator screen SC accordingly display a message indicating the possibility of abnormality occurring in the first service.

In the first embodiment, the administrator is notified in some form when the performance index indicates an occurrence of abnormality even though no abnormality is detected with a publicly-known index such as the golden signal metrics. For example, selection of a button B1 by the administrator causes transition to a screen for checking a state of the first server 30. On this screen, operation of at least one of hardware or software of the first server 30 can be checked. This screen itself may be a publicly-known maintenance tool. The administrator analyzes a cause for the rapid drop in performance index of the current time in the first service alone from this screen. The administrator checks the state of the first server 30, and performs maintenance of the first server 30 as required.

The display unit 25 displays the administrator screen SC that indicates an occurrence of abnormality also when, for example, a difference between the performance index of the second service, the performance index of the third service, or a performance index common to all of the services and the performance index of normal time becomes equal to or more than the threshold value. The administrator selects one of buttons B2 to B4 to check the state of the second server 40, the third server 50, or the shared server 60. For example, the administrator screen SC may be designed so as to display, when the performance index indicates no occurrence of abnormality even though a publicly-known index such as the golden signal metrics indicates an occurrence of some degree of abnormality, no message or a message to the effect that dealing with the situation may be postponed because no abnormality is occurring according to the performance index.

As described above, in the first embodiment, the abnormality determination in the service providing system 2 is executed based on the performance index of each of the first service, the second service, and the third service. This enables identification of abnormality that is unidentifiable with the related art, and accuracy of abnormality determination is consequently raised. For instance, abnormality that cannot be detected with the golden signal metrics can be identified from a business perspective, thus resulting in high accuracy of abnormality determination. Details of the first embodiment are described below.

Figure 4:
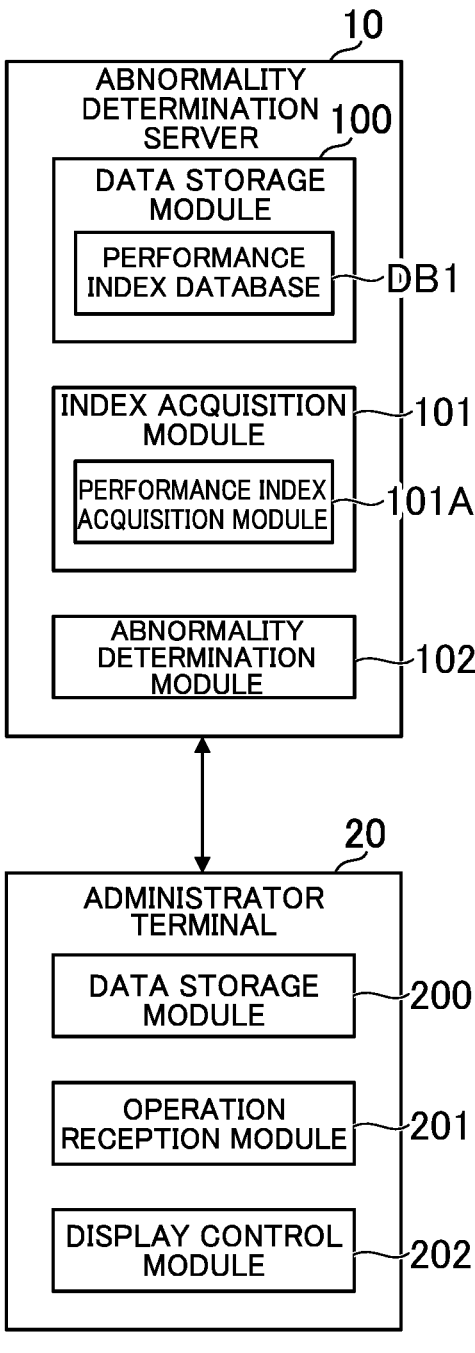
FIG. 4 is a diagram for illustrating an example of functions implemented in an abnormality determination system of a first embodiment of the present disclosure.

1-3. Functions Implemented in Abnormality Determination System of First Embodiment FIG. 4 is a diagram for illustrating an example of functions implemented in the abnormality determination system 1 of the first embodiment.

[1-3-1. Functions implemented in Abnormality Determination Server]

The abnormality determination server 10 includes a data storage module 100, an index acquisition module 101, and an abnormality determination module 102. The data storage module 100 is implemented by the storage unit 12. The index acquisition module 101 and the abnormality determination module 102 are implemented by the control unit 11.

[Data Storage Module]

The data storage module 100 stores data required for the abnormality determination. For example, the data storage module 100 stores a performance index database DB1.

FIG. 5 is a table for showing an example of the performance index database DB1. The performance index database DB1 is a database in which the performance index of a service is stored. The performance index database DB1 stores, for example, a service ID, an execution date and time of the abnormality determination, the performance index acquired at the execution date and time, and an abnormality determination execution result. Any information may be stored in the performance index database DB1. Information to be stored in the performance index database DB1 is not limited to the example of FIG. 5.

The service ID is an example of service identification information by which a service is identifiable. The service identification information may be any information, and is not limited to the service ID. For instance, the service identification information may be a name of the service or a name of a company that provides the service. A period is a period for which the abnormality determination is performed. In the first embodiment, a case in which the length of the period is 1 day is described. The period, however, may have any length. For example, the length of the period may be from 10 seconds to 30 minutes or so, from 1 hour to a half of a day or so, from a few days to 1 week or so, or other lengths of time.

The performance index is acquired by a performance index acquisition module 101A described later. Specific examples of the performance index are as described above. In the first embodiment, the abnormality determination is executed for every minute, and the performance index is accordingly acquired and stored in the performance index database DB1 for every minute. The abnormality determination execution result is the result of executing the abnormality determination by the abnormality determination module 102 described later. In the example of FIG. 5, the abnormality determination execution result takes one of a first value signifying normality and a second value signifying abnormality. The abnormality determination result may take an intermediate value between those two values instead of those two values. The abnormality determination result may be, for example, the abnormality score described above.

Data to be stored in the data storage module 100 is not limited to the performance index database DB1. It is sufficient for the data storage module 100 to store data required for the abnormality determination, and the data storage module 100 may store any data. For example, the data storage module 100 may store an abnormality determination criterion. In the first embodiment, an abnormality determination criterion which is a criterion to be compared to the performance index is set for each service. For example, the data storage module 100 may store the abnormality determination criterion of the first service, the abnormality determination criterion of the second service, and the abnormality determination criterion of the third service. For example, the abnormality determination criterion includes a threshold value to be used in abnormality determination.

[Index Acquisition Module]

The index acquisition module 101 acquires an index usable in the abnormality determination about an occurrence of abnormality in the service providing system 1 for providing a predetermined service. This index is information to be referred to in the abnormality determination. For example, information compared to the abnormality determination criterion corresponds to the index. In the first embodiment, a performance index is described as an example of the index. The index acquisition module 101 includes the performance index acquisition module 101A. In a case in which no other index than the performance index is used, the index acquisition module 101 which is a concept superordinate to the performance index acquisition module 101A may be omitted.

The performance index acquisition module 101A acquires, based on a utilization situation about the service providing system 2 for providing a predetermined service, the performance index about performance of the service. The utilization situation is the degree of use of the service. For example, results of executing payment (e.g., a payment amount, a payment destination, a payment date and time, and the number of errors), results of receiving an order (e.g., a price of an article of commerce, a shop that has taken the order, and an order date and time), results of receiving a reservation (e.g., a reserved facility, a utilization quantity, and a reservation date and time), results of membership registration by a new user, a history of access to the service, and a history of login to the service correspond to the utilization situation.

In a case of a video distribution service, for example, the number of viewers of streaming distribution corresponds to the utilization situation. In a case of a service in which some event is held, the number of entries to the event corresponds to the utilization situation. In a case of a service in which a coupon is distributed, an acquisition rate of the coupon corresponds to the utilization situation. In a case of a service for enabling use of reward points, a quantity in which reward points have been given or a quantity in which reward points have been redeemed corresponds to the utilization situation.

In a case of a call center service, a quantity of calls to operators corresponds to the utilization situation. In a case of an illicitness detection service for executing illicitness detection when some form of utilization by a user takes place, a quantity in which illicitness has been detected corresponds to the utilization situation. In a case of an SNS, the number of posts corresponds to the utilization situation. For other services as well, the utilization situation that varies depending on the service may be acquired.

The service providing system 1 in the first embodiment is a system for providing a plurality of services. The performance index acquisition module 101A accordingly acquires the performance index of each of the plurality of services. For example, the performance index acquisition module 101A acquires the performance index of each of the first service, the second service, and the third service. For example, the performance index acquisition module 101A acquires the utilization situation of the first service from the first server 30. The performance index acquisition module 101A acquires the performance index of the first service based on the utilization situation of the first service.

For example, the performance index acquisition module 101A acquires the utilization situation of the second service from the second server 40. The performance index acquisition module 101A acquires the performance index of the second service based on the utilization situation of the second service. For example, the performance index acquisition module 101A acquires the utilization situation of the third service from the third server 50. The performance index acquisition module 101A acquires the performance index of the third service based on the utilization situation of the third service. In the first embodiment, the performance index acquisition module 101A does not receive the utilization situation from the shared server 60. However, the performance index acquisition module 101A may acquire the utilization situation of each of the first service, the second service, and the third service from the shared server 60.

In the first embodiment, a case in which the performance index acquisition module 101A acquires, in real time, the performance index of a service that is in operation is described. A service being in operation means that the service is being provided. For example, for each of the first server 30, the second server 40, and the third server 50, holding some form of communication to and from a user terminal operated by a user, and executing processing for fulfilling the user's request received from the user terminal correspond to the service being in operation. That is, with respect to each of the first service, the second service, and the third service, the utilization situation of the service being kept updated corresponds to the service being in operation.

Real time means the current time or an immediate past period. The immediate past period is a period from a point in time that precedes the current time by a predetermined length of time to the current time. The immediate past period can also be said as a latest period out of periods for which the performance index is stored in the performance index database DB1. In the first embodiment, the unit time of abnormality determination is 1 minute, and the performance index acquisition module 101A accordingly acquires, for every minute, the performance index for a period from 1 minute earlier than the current time to the current time. For example, the performance index acquisition module 101A acquires, for every minute, the latest utilization situation from each of the first server 30, the second server 40, and the third server 50 to acquire the performance index of each of the first service, the second service, and the third service.

The performance index acquisition module 101A may acquire the performance index of a not too distant past instead of real time. For example, the performance index acquisition module 101A may acquire the performance index in a past period earlier than the immediate past period. The performance index acquisition module 101A may acquire a future performance index by predicting the future performance index with use of a simulator created in advance. For example, the simulator defines a relationship between a period to which the current time belongs and a future performance index based on a past actual performance value of the period. This relationship is defined in a mathematical expression, a table, a part of a program code, or a model using a method of machine learning.

In the first embodiment, a case in which the performance index acquisition module 101A acquires, as the performance index, a payment index about payment in a service is described. The payment index is an index indicating a payment execution situation. The payment index is, for example, a payment amount, a total value of payment amounts, an average value of payment amounts, the number of payment transactions, a payment destination, or a payment date and time, or a combination thereof. In the example of FIG. 3, for each of the first service, the second service, and the third service, the total value of payment amounts in the service per minute corresponds to the payment index.

For example, the performance index acquisition module 101A acquires the payment execution situation in the first service from the first server 30. The performance index acquisition module 101A acquires the payment index of the first service based on the payment execution situation in the first service. In the example of FIG. 3, the performance index acquisition module 101A acquires, for every minute, the payment index which is the total value of payment amounts in payment of the first service that has been executed in that 1 minute. For the second service and the third service as well, the performance index acquisition module 101A acquires, for every minute, the payment index in that 1 minute in a similar manner.

The performance index may be, instead of a total value as the one described above, another value such as an average value, a median value, or a mode value. Calculation of those may be executed on the first server 30, the second server 40, and the third server 50. In this case, the utilization situation and the performance index may be the same. The performance index acquisition module 101A may acquire, as the performance index, the utilization situation received from each of the first server 30, the second server 40, and the third server 50. The same applies to a performance index other than the payment amount, and the performance index acquisition module 101A may acquire the performance index by calculating a total value or the like of the utilization situation, or may acquire the received utilization situation as the performance index without modification.

Each of the first server 30, the second server 40, and the third server 50 stores thereon a utilization situation database about the utilization situation of the service provided by itself. Each of the first server 30, the second server 40, and the third server 50 stores, when one user uses the service (for example, when payment is executed), the utilization situation indicating that this user has used the service in the utilization situation database. In response to a request from the abnormality determination server 10, each of the first server 30, the second server 40, and the third server 50 transmits the utilization situation of any period (in the first embodiment, the immediate past 1 minute) out of the utilization situation stored in the utilization situation database to the abnormality determination server 10. The performance index acquisition module 101A may acquire the performance index based on this utilization situation.

[Abnormality Determination Module]

The abnormality determination module 102 executes the abnormality determination in the service providing system 1 based on the index acquired by the index acquisition module 101. In the first embodiment, a performance index is used as this index, and the abnormality determination module 102 accordingly executes the abnormality determination in the service providing system 1 based on the performance index acquired by the performance index acquisition module 101A. Although the abnormality determination using the abnormality determination criterion is taken as an example in the first embodiment, the method of executing the abnormality determination is not limited to the example of the first embodiment. As in a modification example described later, the method of machine learning may be used instead of the abnormality determination criterion.

For example, the abnormality determination module 102 executes the abnormality determination by determining whether the performance index satisfies a predetermined abnormality determination criterion. The abnormality determination criterion is a criterion set for the abnormality determination. The abnormality determination criterion is set so that it is determined that there is abnormality when the abnormality determination criterion is satisfied. The abnormality determination criterion includes, for example, at least one threshold value. In the first embodiment, a case in which the performance index being less than the threshold value corresponds to an occurrence of abnormality is taken as an example. However, the performance index being equal to or more than the threshold value may correspond to an occurrence of abnormality. To give another example, the abnormality determination may be executed by, instead of comparing the performance index and the threshold value, determining whether an amount of change in the performance index is equal to or more than a threshold value.

In the first embodiment, the abnormality determination module 102 executes the abnormality determination of at least one of the plurality of services based on the performance index of each of the plurality of services. For example, the abnormality determination module 102 executes the abnormality determination of the first service based on the performance index of the first service. The abnormality determination module 102 executes the abnormality determination of the second service based on the performance index of the second service. The abnormality determination module 102 executes the abnormality determination of the third service based on the performance index of the third service.

A service of which the performance index is acquired and a service that is a target of the abnormality determination are the same in a case described in the first embodiment, but may be different services. For instance, the abnormality determination module 102 may execute the abnormality determination of the second service or the third service based on the performance index of the first service. The abnormality determination module 102 executes the abnormality determination of the first service or the third service based on the performance index of the second service. The abnormality determination module 102 executes the abnormality determination of the first service or the second service based on the performance index of the third service.

To give another example, the abnormality determination module 102 may execute the abnormality determination of the first service based on the performance index of the first service and on the performance index of at least one of the second service or the third service. The abnormality determination module 102 may execute the abnormality determination of the second service based on the performance index of the second service and on the performance index of at least one of the first service or the third service. The abnormality determination module 102 may execute the abnormality determination of the first service based on the performance index of the third service and on the performance index of at least one of the first service or the second service.

In the first embodiment, the abnormality determination module 102 executes the abnormality determination in real time based on the performance index acquired in real time. The meaning of real time is as described above. The abnormality determination module 102 may execute the abnormality determination for abnormality in a not too distant past instead of real time. For example, the abnormality determination module 102 may execute the abnormality determination for abnormality in a past period earlier than the immediate past period. Conversely, the abnormality determination module 102 may execute the abnormality determination for a future based on the future performance index acquired by the simulator.

In the first embodiment, the payment index corresponds to the performance index, and the abnormality determination module 102 accordingly executes the abnormality determination based on the payment index. For example, the abnormality determination module 102 executes the abnormality determination by determining whether the payment index satisfies the abnormality determination criterion. The abnormality determination module 102 executes the abnormality determination by determining whether the abnormality determination criterion set in advance is satisfied based on the payment index. For example, when it is determined that the abnormality determination criterion is satisfied, the abnormality determination module 102 outputs a determination result indicating that abnormality has occurred. Conversely, the abnormality determination module 102 may output a determination result indicating that abnormality has occurred it is determined that the abnormality determination criterion is not satisfied. Which processing is executed depends on how the abnormality determination criterion is defined.

In the example of FIG. 3, the abnormality determination module 102 determines, for every minute, whether the payment index of the first service in that 1 minute satisfies the abnormality determination criterion set for the first service. For example, the abnormality determination module 102 outputs a determination result indicating that no abnormality has occurred when that payment index is equal to or more than a threshold value indicated by that abnormality determination criterion. The abnormality determination module 102 outputs a determination result indicating that abnormality has occurred when that payment index is less than the threshold value indicated by that abnormality determination criterion. The abnormality determination module 102 executes the abnormality determination in a similar manner for the second service and the third service as well.

The abnormality determination module 102 may output, for every minute, a determination result indicating that no abnormality has occurred when the payment index of the first service in that 1 minute is less than the threshold value indicated by the abnormality determination criterion that is set for the first service. The abnormality determination module 102 may output a determination result indicating that abnormality has occurred when the payment index is equal to or more than the threshold value indicated by that abnormality determination criterion. The abnormality determination module 102 may execute the abnormality determination in a similar manner for the second service and the third service as well.

[1-3-2. Functions implemented on Administrator Terminal]

The administrator terminal 20 includes, for example, a data storage module 200, an operation reception module 201, and a display control module 202. The data storage module 200 is implemented mainly by the storage unit 22. The operation reception module 201 and the display control module 202 are implemented mainly by the control unit 21.

[Data Storage Module]

The data storage module 200 stores data required for tasks of the administrator. For example, the data storage module 200 stores data required to display the administrator screen SC. The data storage module 200 may store a maintenance tool required for the tasks of the administrator. The maintenance tool itself may be a publicly-known tool, and it is sufficient for the maintenance tool to be, for example, a tool that enables monitoring of the state of at least one of hardware or software.

[Operation Reception Module]

The operation reception module 201 receives various types of operation performed by the administrator. For example, the operation reception module 201 receives operation performed on the administrator screen SC.

[Display Control Module]

The display control module 202 displays various screens on the display unit 25. For example, the display control module 202 displays the administrator screen SC on the display unit 25. When the administrator selects one of the buttons B1 to B4, the display control module 202 causes the display unit 25 to display the state of one of the first server 30, the second server 40, the third server 50, and the shared server 60.

Figure 6:
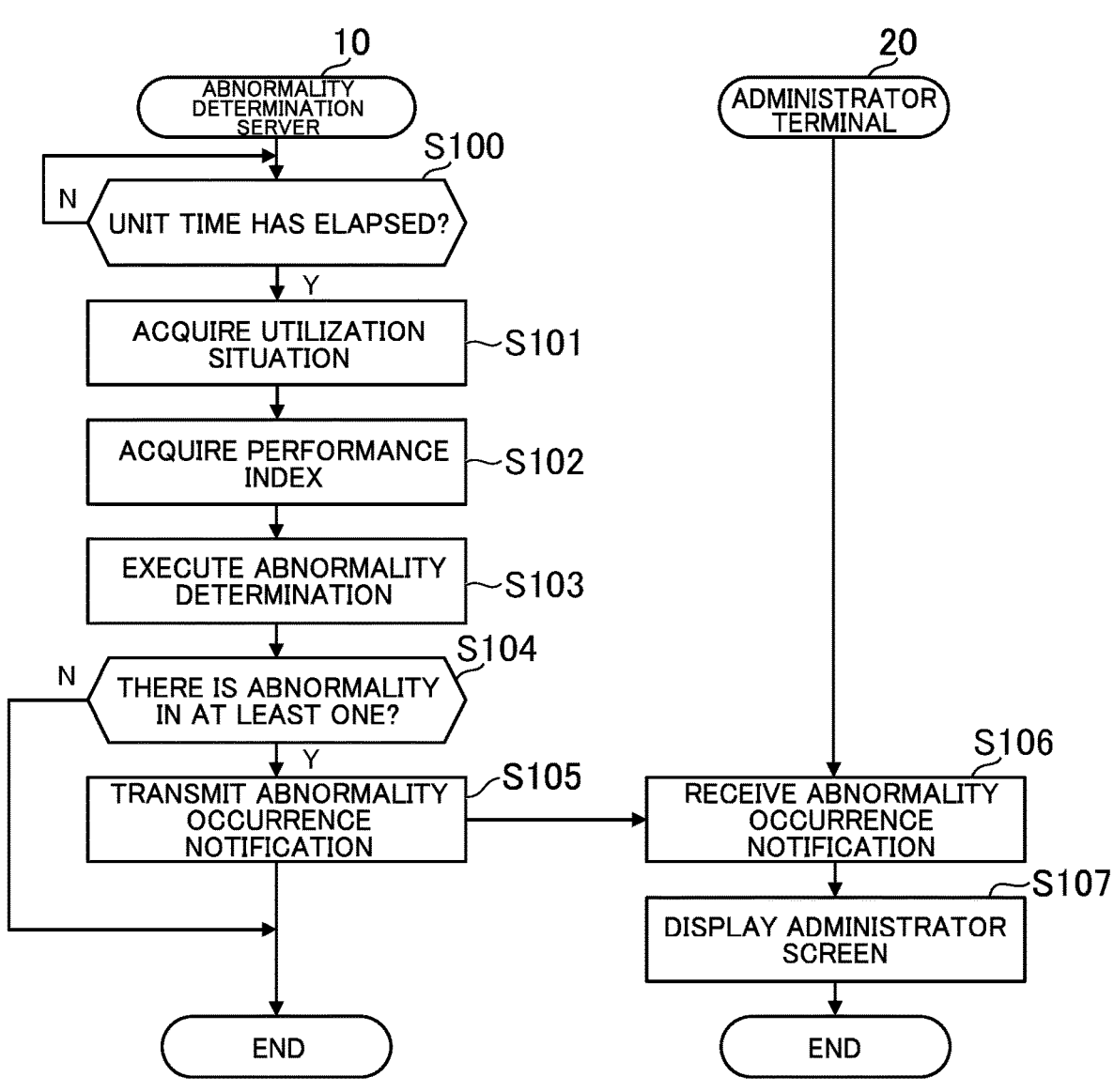
FIG. 6 is a diagram for illustrating an example of processing executed in the abnormality determination system of the first embodiment.

1-4. Processing Executed in Abnormality Determination System of First Embodiment FIG. 6 is a diagram for illustrating an example of processing executed in the abnormality determination system 1 of the first embodiment. The processing of FIG. 6 is executed by the control units 11 and 21 by executing programs stored in the storage units 12 and 22, respectively. As illustrated in FIG. 6, the abnormality determination server 10 determines whether 1 minute, which is the unit time, has elapsed (Step S100). In Step S100, the abnormality determination server 10 determines whether 1 minute has elapsed since the last abnormality determination. When it is determined that 1 minute has not elapsed (Step S100: N), the process returns to the processing step of Step S100.

When it is determined in Step S100 that 1 minute has elapsed (Step S100: Y), the abnormality determination server 10 acquires the utilization situations of the first service, the second service, and the third service from the first server 30, the second server 40, and the third server 50, respectively (Step S101). The utilization situations acquired in Step S101 include payment amounts of all payment transactions executed in the immediate past 1 minute. The first server 30, the second server 40, and the third server 50 may each calculate the total value of the payment amounts and transmit the total amount as the utilization situation to the abnormality determination server 10.

The abnormality determination server 10 acquires the performance indices of the first service, the second service, and the third service based on the utilization situations of the first service, the second service, and the third service, respectively (Step S102). In Step S102, the abnormality determination server 10 calculates, for each service, the total value of payment amounts of payment executed in the immediate past 1 minute, and acquires the total value as the performance index of the service.

The abnormality determination server 10 executes the abnormality determination for the first service, the second service, and the third service based on the performance indices of the first service, the second service, and the third service, respectively (Step S103). In Step S103, the abnormality determination server 10 determines whether the abnormality determination criterion associated with the first service is satisfied, based on the performance index of the first service. The abnormality determination server 10 determines whether the abnormality determination criterion associated with the second service is satisfied, based on the performance index of the second service. The abnormality determination server 10 determines whether the abnormality determination criterion associated with the third service is satisfied, based on the performance index of the third service.

The abnormality determination server 10 determines whether it has been determined that there is abnormality in at least one of the first service, the second service, or the third service (Step S104). In Step S104, the abnormality determination server 10 determines whether the abnormality determination criterion is satisfied in at least one of the first service, the second service, or the third service. When the abnormality determination criterion satisfied in a service, the abnormality determination server 10 determines that abnormality has occurred in the service. When it is determined in Step S104 that there is no abnormality in any of the first service, the second service, and the third service (Step S104: N), this processing is ended.

When it is determined in Step S104 that there is abnormality in at least one of the first service, the second service, or the third service (Step S104: Y), the abnormality determination server 10 transmits an abnormality occurrence notification notifying that abnormality has occurred in the at least one service to the administrator terminal 20 (Step S105). Any medium is usable for the notification, and the notification may be via electronic mail, an SMS, an SNS, a message app, or a maintenance tool. The administrator terminal 20 receives the abnormality occurrence notification from the abnormality determination server 10 (Step S106), and displays the administrator screen SC on the display unit 25 based on the abnormality occurrence notification (Step S107). This processing is then ended.

The abnormality determination system 1 of the first embodiment acquires the performance index about performance of a service based on the utilization situation about the service providing system 2. The abnormality determination system 1 executes abnormality determination with regard to an occurrence of abnormality in the service providing system 2 based on the performance index. This enables identification of abnormality that is unidentifiable with, for example, the golden signal metrics, from a business perspective, and accordingly raises the accuracy of abnormality determination. In the case of the example of FIG. 3, although it is determined from the golden signal metrics of the first server 30 that there is no abnormality, abnormality may be occurring in a part in which determination is impossible with the golden signal metrics alone. In this case, it can be determined from the performance index that some abnormality is occurring on the first server 30, and the accuracy of abnormality determination is consequently raised. For instance, the administrator can make a decision that abnormality is not required to immediately be dealt with, when the golden signal metrics indicate occurrence of some abnormality but there is no significant impact on the performance index.

The abnormality determination system 1 executes abnormality determination of at least one of a plurality of services based on the performance index of each of the plurality of services. This execution of abnormality enables determination of at least one service even when the service providing system 1 provides a plurality of services. For example, in a case of executing the abnormality determination of the first service based on the performance index of the first service and on the performance index of at least one of the second service or the third service, abnormality determination can be executed through comprehensive consideration of not only the performance index of the first service but also the performance index of another service, and the accuracy of abnormality determination is accordingly raised.

The abnormality determination system 1 executes the abnormality determination in real time based on the performance index acquired in real time. This enables quick detection of abnormality occurring in the service providing system 1.

The abnormality determination system 1 executes the abnormality determination based on a payment index. When some abnormality occurs with regard to payment in the service providing system 1, this enables quick detection of the abnormality. For example, abnormality that has a significant impact in terms of business can be detected by using a payment index directly linked to business.

2. Second Embodiment

A second embodiment, which is another embodiment of the abnormality determination system 1, is described next. For example, the service providing system 2 may run a campaign at a specific time. During running of the campaign, utilization of the service increases, and the increased utilization may cause the utilization situation to differ from the utilization situation of normal time, which is a time other than a campaign time, namely, a time in which no campaign is run. Accordingly, the abnormality determination system 1 may be designed so as to enhance flexibility of the abnormality determination by varying the abnormality determination criterion from normal time to a time in which a campaign is run.

Figure 7:
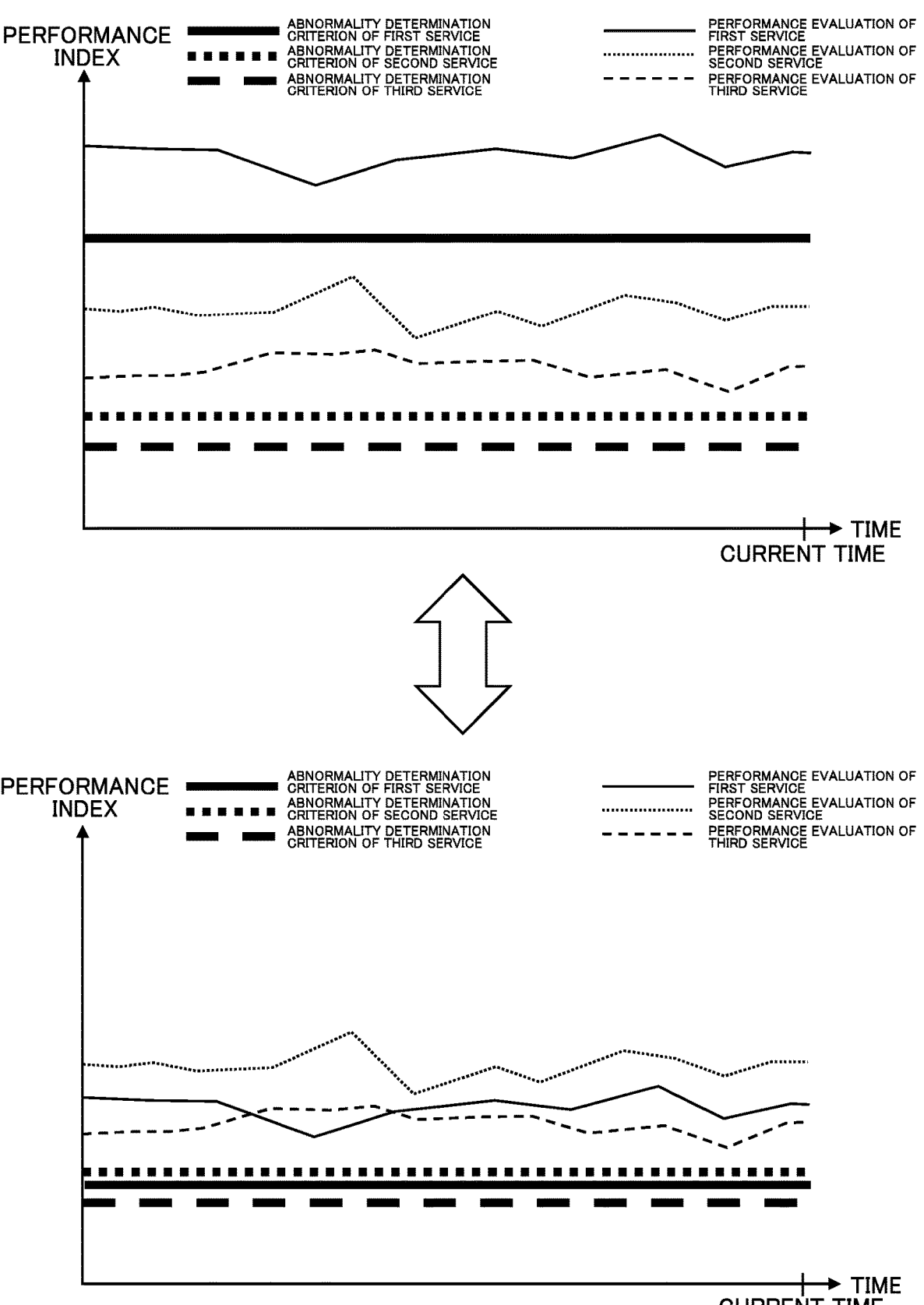
FIG. 7 is a graph for showing an example of a performance index in a campaign time and a performance index in a normal time.

FIG. 7 is a graph for showing an example of the performance index in a campaign time and the performance index in a normal time. An example in an upper part of FIG. 7 deals with changes in the performance indices in time series in a case in which the first service is running a campaign and the second service and the third service are having a normal time. An example in a lower part of FIG. 7 deals with changes in the performance indices in time series in a case in which all three of the first service, the second service, and the third service are having a normal time. As in the example in the upper part of FIG. 7, the performance index of the first service in a campaign time is higher than the performance index of normal time.

For example, occurrence of abnormality in a campaign time causes more opportunity losses and accordingly has a greater impact in terms of business. For that reason, the abnormality determination criterion is raised in a campaign time. In the example of FIG. 7, the abnormality determination criterion of the first service is represented by the heavy solid line. As shown in FIG. 7, the abnormality determination criterion of a campaign time is higher than the abnormality determination criterion of normal time. For the second service and the third service which are not running a campaign, the abnormality determination criterion is not changed. Details of the second embodiment are described below. In the second embodiment, descriptions on configurations that are the same as the configurations in the first embodiment are omitted.

Figure 8:
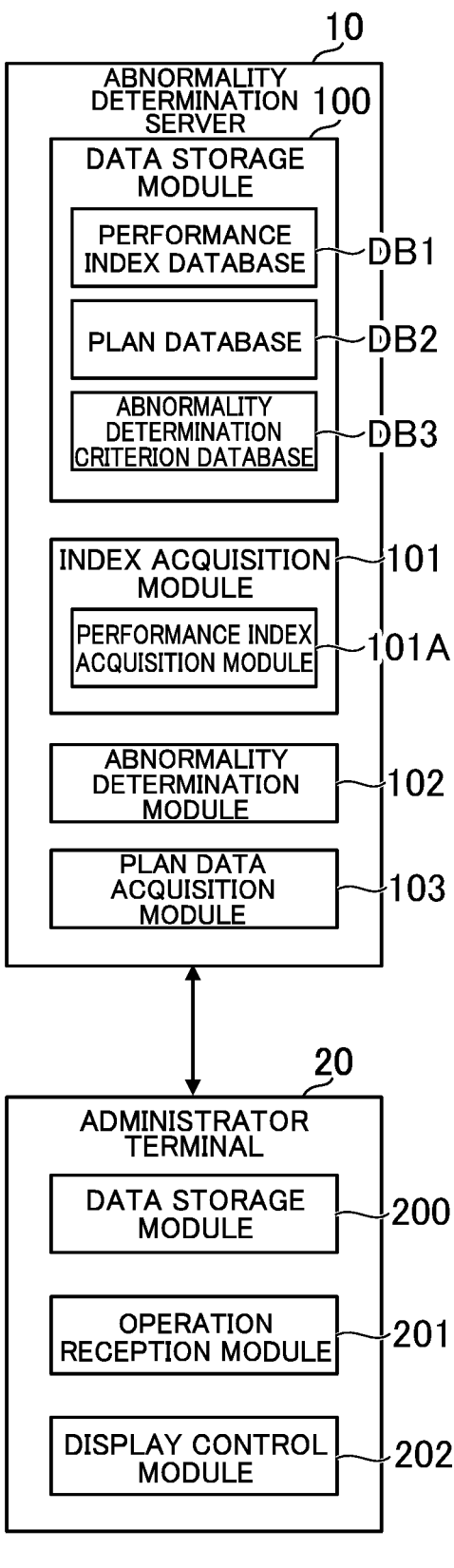
FIG. 8 is a diagram for illustrating an example of functions implemented in an abnormality determination system of a second embodiment of the present disclosure.

2-1. Functions Implemented in Abnormality Determination System of Second Embodiment FIG. 8 is a diagram for illustrating an example of functions implemented in the abnormality determination system 1 of the second embodiment. The abnormality determination server 10 includes, for example, the data storage module 100, the index acquisition module 101, the abnormality determination module 102, and a plan data acquisition module 103. As to the data storage module 100, the index acquisition module 101, and the abnormality determination module 102, differences from the first embodiment are described. The plan data acquisition module 103 is implemented by the control unit 11. Functions implemented on the administrator terminal 20 may be the same as those in the first embodiment.

[Data Storage Module]

The data storage module 100 in the second embodiment stores, in addition to the performance index database DB1 described in the first embodiment, a plan database DB2 and an abnormality determination criterion database DB3.

FIG. 9 is a table for showing an example of the plan database DB2. The plan database DB2 is a database in which information about a plan in the service providing system 2 is stored. In the second embodiment, a case in which a campaign corresponds to the plan is described. However, the plan itself can be of any type, and is not limited to a campaign. For example, the plan may be some event other than a campaign, an offline event, release of a new service, maintenance, or a plan about another service.

For example, a date and time of the plan, a name of the plan, and contents of the plan are stored in the plan database DB2. In the second embodiment, each record included in the plan database DB2 corresponds to a piece of plan data. Those pieces of information are registered in the plan database DB2 by the administrator or another person. The contents of the plan are, for example, a service ID of a service relevant to the plan, a type of the plan, or the utilization situation expected at the date and time of the plan, or a combination thereof. Any information related to a plan may be stored in the plan database DB2. Information to be stored in the plan database DB2 is not limited to the example of FIG. 9.

FIG. 10 is a table for showing an example of the abnormality determination criterion database DB3. The abnormality determination criterion database DB3 is a database in which the abnormality determination criterion to be used in the abnormality determination is stored. For example, the abnormality determination criterion database DB3 stores the abnormality determination criterion for each plan. For example, the administrator registers, for each plan in the service providing system 2, the abnormality determination criterion in the abnormality determination criterion database DB3. When a campaign is to be run, the administrator specifies the abnormality determination criterion by taking the performance index in a similar campaign of the past into consideration. The abnormality determination criterion in a campaign time and the abnormality determination criterion in a normal time are stored in the abnormality determination criterion database DB3.

The abnormality determination criterion may be determined by a method other than specification by the administrator. For example, a method of machine learning may be used so that the abnormality determination criterion is determined based on a learning model that has learned a past trend. In this case, the abnormality determination server 10 inputs contents of a planned event to the trained learning model. The abnormality determination server 10 stores the abnormality determination criterion output from the learning model in the abnormality determination criterion database DB3 in association with the planned event. To give another example, the abnormality determination criterion may be determined by a rule-based method or other methods.

[Index Acquisition Module]

The second embodiment gives a description on a case in which the index acquisition module 101 acquires the performance index described in the first embodiment. However, the index acquisition module 101 may acquire an index other than a performance index. "Performance index" in the description of the second embodiment can be read as another index. For example, the index acquisition module 101 may acquire at least one of a hardware index which is an index about hardware or a software index which is an index about software. The golden signal metrics described in the first embodiment are an example of the hardware index and the software index. The hardware index and the software index may be acquired based on a program used in a benchmark test or a maintenance tool.

The hardware index is an index about a load on hardware. The software index is an index about operation of software. The hardware index and the software index themselves may be publicly-known indices. An index other than the hardware index may be used. For example, the hardware index may be a CPU utilization ratio, a memory utilization ratio, a network utilization ratio, or an electric power utilization ratio, or a combination thereof. For example, temperature of hardware or surroundings of hardware reaching the abnormality determination criterion or higher may correspond to abnormality of hardware. The software index is, for example, a processing time required to execute a program for a test, or a processing time required to read predetermined data.

[Plan Data Acquisition Module]

The plan data acquisition module 103 acquires plan data about a plan of a service. For example, the plan data acquisition module 103 refers to the plan database DB2 to acquire the plan data. In a case in which the plan data is stored in another database other than the plan database DB2, it suffices that the plan data acquisition module 103 acquires the plan data by referring to the another database. In a case in which the plan data is stored on another computer other than the abnormality determination server 10, or on an information storage medium, it suffices that the plan data acquisition module 103 acquires the plan data from the another computer or the information storage medium.

In the second embodiment, the plan data indicates a campaign time in which a campaign related to the service is run. The campaign time is a period in which a campaign is run. The campaign time may last any length. For example, the length of the campaign time may be from 1 minute to 1 hour, from a few hours to a few days, from 1 week to 1 month, or other lengths. In the example of FIG. 10, a case in which the campaign time is expressed by a date and a time is shown. However, the campaign time may be expressed by a date alone without a time.

[Abnormality Determination Module]

The abnormality determination module 102 in the second embodiment executes the abnormality determination based on the performance index and the plan data. In the second embodiment, the plan data indicates a campaign time, and the abnormality determination module 102 accordingly executes the abnormality determination based on the performance index and the campaign time indicated by the plan data. For example, the abnormality determination module 102 determines the abnormality determination criterion based on the campaign time. The abnormality determination module 102 determines whether the campaign time has arrived.

For example, when it is determined that the campaign time has not arrived, the abnormality determination module 102 executes the abnormality determination based on the abnormality determination criterion of normal time. When it is determined that the campaign time has arrived, the abnormality determination module 102 refers to the abnormality determination criterion database DB3 to acquire the abnormality determination criterion associated with the campaign time. The abnormality determination module 102 executes the abnormality determination based on the performance index and the acquired abnormality determination criterion. The method of acquiring the abnormality determination criterion differs from the method of the first embodiment, but processing of abnormality determination after the acquisition of the abnormality determination criterion itself is the same as in the first embodiment.

How the abnormality determination module 102 uses the plan data for the abnormality determination is not limited to the example described above. For instance, the abnormality determination module 102 may determine whether to execute the abnormality determination based on the plan data, instead of determining the abnormality determination criterion based on the plan data. The abnormality determination module 102 may determine whether a campaign time indicated by the plan data has arrived to hold off execution of the abnormality determination when it is determined that the campaign time has not arrived, and to execute the abnormality determination based on the performance index when it is determined that the campaign time has arrived. Conversely, the abnormality determination module 102 may hold off execution of the abnormality determination when it is determined that the campaign time has arrived, and execute the abnormality determination based on the performance index when it is determined that the campaign time has not arrived.

Figure 11:
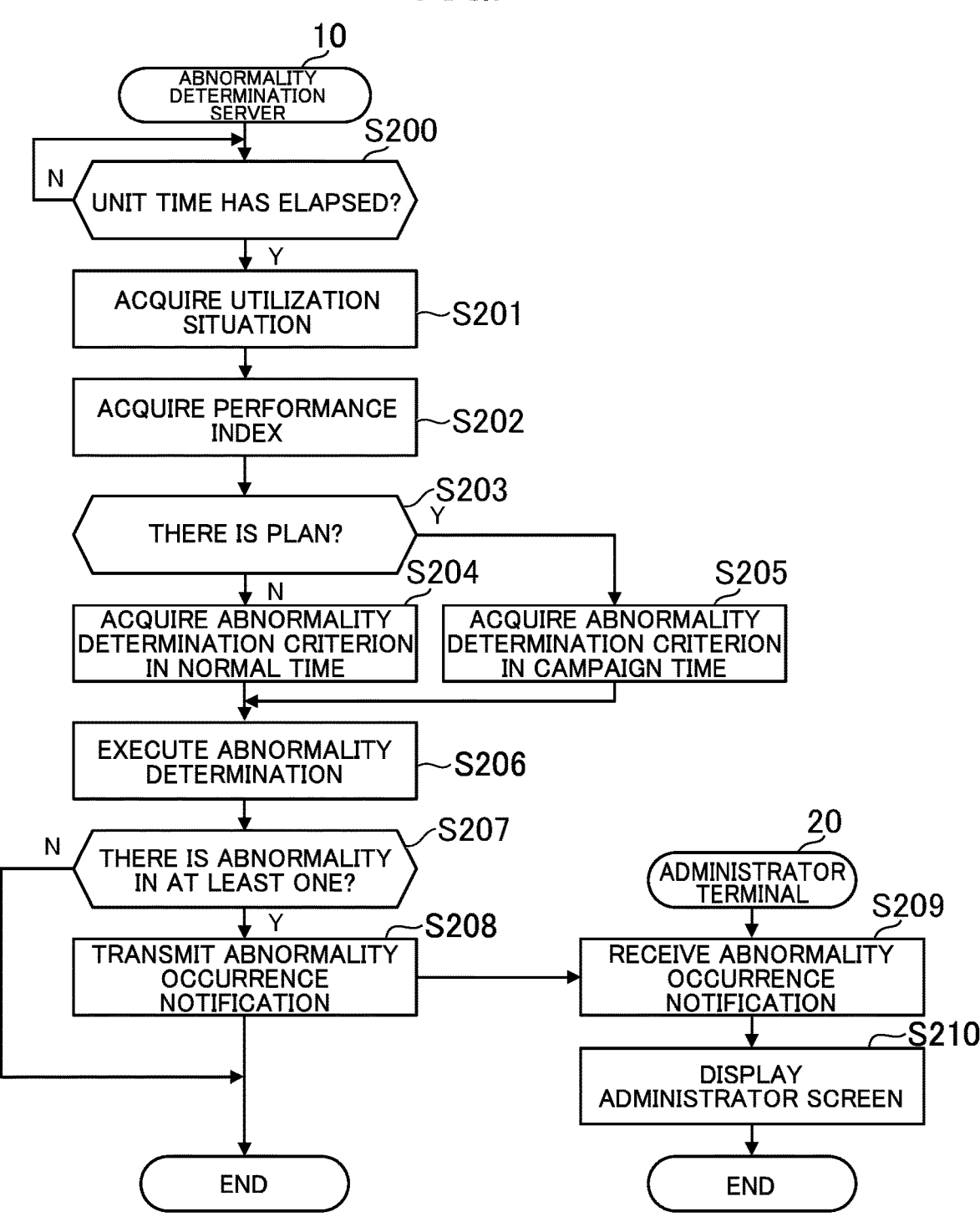
FIG. 11 is a diagram for illustrating an example of processing executed in the abnormality determination system of the second embodiment.

2-2. Processing Executed in Abnormality Determination System of Second Embodiment FIG. 11 is a diagram for illustrating an example of processing executed in the abnormality determination system 1 of the second embodiment. The processing of FIG. 11 is executed by the control units 11 and 21 by executing programs stored in the storage units 12 and 22, respectively. As illustrated in FIG. 11, processing steps of from Step S200 to Step S202 are the same as the processing steps of from Step S100 to Step S102.

The abnormality determination server 10 refers to the plan database DB2 to determine whether there is a plan to which the current time belongs (Step S203). When it is determined in Step S203 that there is no plan to which the current time belongs (Step S203), the abnormality determination server 10 refers to the abnormality determination criterion database DB3 to acquire the abnormality determination criterion in a normal time (Step S204).

When it is determined in Step S203 that there is no plan to which the current time belongs (Step S203), the abnormality determination server 10 refers to the abnormality determination criterion database DB3 to acquire the abnormality determination criterion in a campaign time (Step S205). Processing steps of from Step S206 to Step S211 differ from the processing steps of from Step S102 to Step S107 in that the abnormality determination criterion acquired in Step S204 or Step S205 is used, but are the same as the processing steps of from Step S102 to Step S107 with regard to the rest.

The abnormality determination system 1 of the second embodiment executes the abnormality determination based on the performance index and the plan data. This enables abnormality determination fit to a plan that is indicated by the plan data, and accordingly enhances flexibility of the abnormality determination. For instance, in a case in which the performance index is expected to rise at a certain time, raising the abnormality determination criterion facilitates prevention of opportunity losses at an important time such as a campaign time. Transmission of needless notification to the administrator terminal 20 is preventable by using, in a normal time, the abnormality determination criterion different from the abnormality determination criterion of a time for which a plan is scheduled. Limiting execution of the abnormality determination to a required time is accomplished by executing the abnormality determination only in a campaign time.

The abnormality determination system 1 executes the abnormality determination based on the performance index and a campaign time indicated by the plan data. This enables abnormality determination suited to an important time such as a campaign time, and accordingly enhances flexibility of the abnormality determination.

3. Modification Examples

The present disclosure is not limited to the first embodiment and the second embodiment described above, and can be modified suitably without departing from the spirit of the present disclosure.

3-1. Modification Examples Concerning First Embodiment

Modification examples concerning the first embodiment are described first.

Modification Example 1-1

For example, the service providing system 1 may include components unique to individual services and components common to a plurality of services as illustrated in FIG. 2. In this case, when the performance index of a specific service alone drops, there is a possibility that abnormality is occurring in a component unique to this service. When an overall performance index of a plurality of services drop, on the other hand, there is a possibility that abnormality is occurring in a component common to the plurality of services. The abnormality determination may accordingly be executed by taking not only the performance index of an individual service but also an overall performance index of a plurality of services into consideration.

The abnormality determination module 102 in Modification Example 1 executes the abnormality determination for each service that is a target of the abnormality determination, based on a relationship between the performance index of the service and an overall performance index of a plurality of services. The overall performance index of a plurality of services is a sum of respective performance indices of the plurality of services. For example, the abnormality determination module 102 calculates a sum of the performance index of the first service, the performance index of the second service, and the performance index of the third service.

For example, the abnormality determination module 102 executes the abnormality determination of the first service based on a relationship between the performance index of the first service and the calculated sum. When the performance index of the first service satisfies the abnormality determination criterion of the first service and the sum does not satisfy an overall abnormality determination criterion, the abnormality determination module 102 determines that abnormality has occurred in the first service. When the sum satisfies the overall abnormality determination criterion, the abnormality determination module 102 determines that abnormality has occurred in overall services. In this case, it may be determined that abnormality has occurred in overall services irrespective of whether the performance index of the first service satisfies the abnormality determination criterion of the first service. The abnormality determination module 102 executes the abnormality determination for the second service and the third service as well in a similar manner.

FIG. 12 is a diagram for illustrating an example of abnormality determination based on the overall performance index of a plurality of services. In the example of FIG. 12, the performance indices of all services, which are the first service, the second service, and the third service, have rapidly dropped. In this case, although there is a possibility that abnormality is occurring on all of the first server 30, the second server 40, and the third server 50, it is also a possibility that all services are having difficulties with payment reception due to abnormality of the shared server 60 shared by the first service, the second service, and the third service.

For example, the abnormality determination module 102 determines that abnormality has occurred on the shared server 60, not on the first server 30, the second server 40, and the third server 50. In this case, the abnormality determination module 102 transmits an abnormality occurrence notification indicating that abnormality has occurred on the shared server 60 to the administrator terminal 20. As illustrated in a lower part of FIG. 12, a message informing of a possibility of abnormality occurring on the shared server 60 is displayed on the administrator screen SC.

The abnormality determination system 1 of Modification Example 1-1 executes the abnormality determination for each service that is a target of the abnormality determination, based on a relationship between the performance index of the service and the overall performance index of a plurality of services. This enables abnormality determination that takes the overall performance index of a plurality of services into consideration, and accordingly raises the accuracy of abnormality determination. For instance, identification of abnormality occurring in a component shared by a plurality of services, instead of a component unique to an individual service, is facilitated.

Modification Example 1-2

For example, the abnormality determination module 102 may execute the abnormality determination for each service that is a target of the abnormality determination, based on a relationship between the performance index of the service and the performance index of another service. That is, the abnormality determination may be executed by taking a relationship between the performance indices of individual services, instead of a relationship between the performance index of an individual service and the overall performance index of a plurality of services (the relationship described in Modification Example 1-1), into consideration.

FIG. 13 is a diagram for illustrating an example of abnormality determination based on a relationship between the performance index of one service and the performance index of another service. In the example of FIG. 13, the performance index of the second service and the performance index of the third service have rapidly dropped. The performance index of the first service is not so different from normal time. In this case, although there is a possibility that abnormality is occurring on each of the second server 40 and the third server 50 separately, it is also a possibility that the second service and the third service are having difficulties with payment reception due to abnormality of a shared platform (for example, some component of the shared server 60) shared by the second service and the third service.

For example, when the performance index of the second service satisfies the abnormality determination criterion and the performance index of the third service satisfies the abnormality determination criterion as well, the abnormality determination module 102 determines that abnormality has occurred in a component shared by the second service and the third service. The abnormality determination module 102 determines that abnormality has occurred in a shared platform implemented by the shared server 60, not on the second server 40 and the third server 50. In this case, the abnormality determination module 102 transmits an abnormality occurrence notification indicating that abnormality has occurred in the shared platform of the shared server 60 to the administrator terminal 20. As illustrated in a lower part of FIG. 13, a message informing of a possibility of abnormality occurring in the shared platform of the shared server 60 is displayed on the administrator screen SC.

For example, when the performance index of the second service satisfies the abnormality determination criterion and the performance index of the third service does not satisfy the abnormality determination criterion, the abnormality determination module 102 determines that abnormality has occurred in a component unique to the second service. When the performance index of the second service does not satisfy the abnormality determination criterion and the performance index of the third service satisfies the abnormality determination criterion, the abnormality determination module 102 determines that abnormality has occurred in a component unique to the third service. Processing executed when it is determined that abnormality has occurred in a component unique to an individual service is the same as in the first embodiment. A relationship of a part of the service providing system 2 in which abnormality has occurred to relationships among services is stored in advance in the data storage module 100.

The abnormality determination system 1 of Modification Example 1-2 executes the abnormality determination for each service that is a target of the abnormality determination, based on a relationship between the performance index of the service and the performance index of another service. This enables abnormality determination that takes the relationship between the performance of indices individual services into consideration, and accordingly raises the accuracy of abnormality determination. For instance, identification of abnormality occurring in a component shared by a plurality of services, instead of a component unique to an individual service, is facilitated.

Modification Example 1-3

For example, when the service providing system 2 provides each of a plurality of services to users as described in the first embodiment, the abnormality determination module 102 may determine, for each of the performance indices of the plurality of services, whether the performance index satisfies the abnormality determination criterion. In this case, the type of performance index sometimes helps to identify a service in which abnormality has occurred out of the plurality of services.

An example in which the performance index acquisition module 101A acquires two performance indices that are a payment index about payment and a login index about a login count is discussed. When the payment index does not satisfy the abnormality determination criterion, there is a possibility that abnormality is occurring in a fintech-based service out of services of the service providing system 2. When the login index does not satisfy the abnormality determination criterion, there is a possibility that abnormality is occurring in a membership management service out of services of the service providing system 2. The type of the performance index that satisfies the abnormality determination criterion thus helps to identify a service in which abnormality has occurred.

The abnormality determination module 102 in Modification Example 1-3 accordingly executes the abnormality determination based on the type of the performance index that satisfies the abnormality determination criterion. In Modification Example 1-3, type data associating a performance index type and a service in which abnormality may have occurred is stored in the data storage module 100. The type data may be in any format, for example, a table, a part of a program code, or a machine model using a method of machine learning. For example, the payment index and a fintech-based service are associated with each other in the type data. The login index and a membership management service are associated with each other in the type data.

Based on the type data, the abnormality determination module 102 determines, for example, that abnormality has occurred in a service associated with the type of the performance index that satisfies the abnormality determination criterion out of the plurality of services. When it is determined that the payment index satisfies the abnormality determination criterion, the abnormality determination module 102 determines that abnormality has occurred in the fintech-based service associated with the payment index. When it is determined that the login index satisfies the abnormality determination criterion, the abnormality determination module 102 determines that abnormality has occurred in the fintech-based service associated with the payment index.

The abnormality determination based on the type of the performance index that satisfies the abnormality determination criterion is not limited to the example described above. The type data may associate a performance index type and a piece of hardware or software in which abnormality may have occurred. In this case, the abnormality determination module 102 may determine that abnormality has occurred in the piece of hardware or software associated with the type of the performance index that satisfies the abnormality determination criterion. The abnormality determination module 102 transmits an abnormality occurrence notification indicating the piece of hardware or software to the administrator terminal 20. Information of the piece of hardware or software is displayed on the administrator screen SC.

The abnormality determination system 1 of Modification Example 1-3 executes the abnormality determination based on the type of the performance index that satisfies the abnormality determination criterion. This enables abnormality determination fit to the type of the performance index, and accordingly raises the accuracy of abnormality determination. For instance, identifying a service in which abnormality may have occurred based on the type of the performance index helps the administrator to identify a service in which abnormality has occurred. Identifying a piece of hardware or software in which abnormality may have occurred based on the type of the performance index helps the administrator to identify a piece of hardware or software in which abnormality has occurred.

Modification Example 1-4

For example, a case of executing abnormality determination based on a performance index is described in the first embodiment. Another index other than a performance index may be considered in the abnormality determination. In Modification Example 1-4, a hardware index is described as an example of the another index. The another index is not limited to the hardware index and may be the software index described in the first embodiment.

Figure 14:
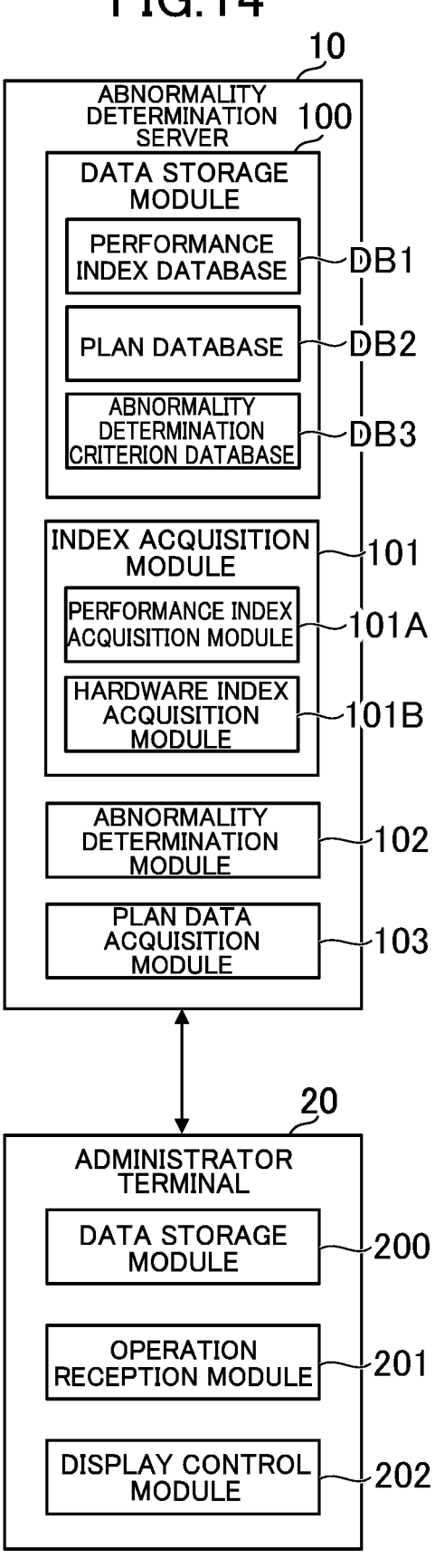
FIG. 14 is a diagram for illustrating an example of functions implemented in Modification Example 1-4.

FIG. 14 is a diagram for illustrating an example of functions implemented in Modification Example 1-4. In FIG. 14, functions implemented in a case of combining the first embodiment and the second embodiment are illustrated. However, the functions described in the second embodiment may be omitted from the abnormality determination system 1. The abnormality determination system 1 of Modification Example 1-4 includes a hardware index acquisition module 101B. The hardware index acquisition module 101B acquires a hardware index about hardware included in the service providing system 2. Details of the hardware index are as described in the first embodiment. A publicly-known method is usable as the method of acquiring the hardware index itself, as also described in the first embodiment.

The abnormality determination module 102 executes the abnormality determination based on the performance index and the hardware index. For example, the abnormality determination module 102 determines whether the abnormality determination criterion is satisfied not only for the performance index but also for the hardware index. In Modification Example 1-4, the abnormality determination criterion about the performance index is hereinafter referred to as "performance index criterion." The abnormality determination criterion about the hardware index is referred to as "hardware index criterion." Processing of determining whether the performance index criterion is satisfied is as described in the first embodiment.

For example, the hardware index criterion includes a threshold value concerning the hardware index. The abnormality determination module 102 executes the abnormality determination by determining whether the hardware index is equal to or more than the threshold value. The abnormality determination module determines that abnormality has occurred when at least one of a CPU utilization ratio, a memory utilization ratio, or a network utilization ratio that is indicated by the hardware index is equal to or more than the threshold value. The hardware index criterion may not particularly include the threshold value. For example, the hardware index criterion may be a criterion such as whether a value output from a learning model that has learned a trend of the hardware index is a predetermined value.

For example, when at least one of the abnormality determination based on the performance index or the abnormality determination based on the hardware index yields a result that determines that abnormality has occurred, the abnormality determination module 102 transmits an abnormality occurrence notification to the administrator terminal 20. When occurrence of abnormality is found in the abnormality determination based on the hardware index, the abnormality occurrence notification includes information about a piece of hardware in which the abnormality has occurred. The display control module 202 displays the information about the piece of hardware in which the abnormality has occurred on the administrator screen SC based on the abnormality occurrence notification.

The abnormality determination system 1 of Modification Example 1-4 executes the abnormality determination based on the performance index and the hardware index. This enables execution of abnormality determination that takes not only a performance index but also a hardware index into consideration, and accordingly raises the accuracy of abnormality determination.

Modification Example 1-5

For example, as described in Modification Example 1-4, the abnormality determination module 102 may determine whether the performance index satisfies a predetermined performance index criterion. The abnormality determination module 102 may determine whether the hardware index satisfies a predetermined hardware index criterion. In this case, the abnormality determination module 102 may execute the abnormality determination so that a degree about abnormality is lower when it is determined that the hardware index criterion is satisfied and that the performance index criterion is not satisfied than when it is determined that the hardware index criterion and the performance index criterion are both satisfied.

The degree about abnormality is information indicating a level of suspicion of abnormality. In other words, the degree about abnormality is information indicating seriousness of abnormality. The degree about abnormality is expressed by information that is not binary and has an intermediate value. That is, the degree about abnormality can take a value indicating one of three levels or more. The abnormality score described in the first embodiment corresponds to the degree about abnormality. Accordingly, "degree about abnormality" in the description can be read as "abnormality score." A name other than "abnormality score" may be used to refer to the degree about abnormality.

For example, the abnormality determination module 102 sets the abnormality score lower when it is determined that the hardware index criterion is satisfied and that the performance index criterion is not satisfied than when it is determined that the hardware index criterion and the performance index criterion are both satisfied. The abnormality determination module 102 may set the abnormality score lower when it is determined that the hardware index criterion is satisfied and that the performance index criterion is not satisfied than when it is determined that the hardware index criterion is not satisfied and that the performance index criterion is satisfied.

In other words, the abnormality determination module 102 sets the degree of abnormality lower when it is determined from consideration of the performance index criterion that no abnormality has occurred, although it is determined from consideration of the hardware index alone that abnormality has occurred, than when it is determined from consideration of the performance index criterion that abnormality has occurred. That is, priority may be given to utilization of the abnormality determination based on the performance index over utilization of the abnormality determination based on the hardware index. When there is abnormality in terms of hardware but impact in terms of business is small, the degree of abnormality is relatively low.

The abnormality determination system 1 of Modification Example 1-5 determines whether the hardware index satisfies a predetermined hardware index criterion, and executes the abnormality determination so that the degree about abnormality is lower when it is determined that the hardware index criterion is satisfied and that the performance index criterion is not satisfied than when it is determined that the hardware index criterion and the performance index criterion are both satisfied. This raises the accuracy of abnormality determination. For instance, when abnormality in terms of hardware is about to occur but impact in terms of business is small, allowing the administrator to postpone dealing with the abnormality or not dealing with the abnormality in the first place can be chosen.

Modification Example 1-6

For example, the performance index is usable not only for determination of abnormality at the current time but also for determination of abnormality in a future. In Modification Example 1-6, the first service (electronic commerce transaction system) described in the first embodiment is taken as an example. During running of a campaign in the first service, more users use the first service and the performance index may accordingly rise. When the performance index is high, load on the service providing system 2 may increase. However, the load on the service providing system 2 not always increases immediately after the performance index rises.

An example in which the number of articles of commerce placed in shopping carts corresponds to the performance index is discussed. In this case, it is presumed that payment for purchasing the articles of commerce is executed in a concentrated manner after some time elapses since the performance index reaches a threshold value or higher. Then there is a possibility that a failure occurs in the service providing system 2 after some time elapses since the performance index reaches the threshold value or higher. The abnormality determination module 102 may accordingly execute abnormality determination with regard to an occurrence of abnormality in the future based on the performance index.

For example, when the performance index satisfies the abnormality determination criterion, the abnormality determination module 102 determines that abnormality occurs in a future, not a time indicated by the performance index (for example, the current time). The future here is a time later than the time indicated by the performance index. A time interval between those times may be any length. This time interval may be specified by the administrator, or may be determined dynamically from a past trend. This time interval may be set for each service separately. Data indicating the time interval is stored in the data storage module 100 in advance.

For example, in a case in which an average time interval from placement of an article of commerce in a shopping cart to execution of payment is 5 minutes, the abnormality determination module 102 determines that abnormality possibly occurs on the first server 30 five minutes after the time indicated by the performance index. The abnormality determination module 102 transmits an abnormality occurrence notification indicating the possibility of abnormality occurring on the first server 30 after 5 minutes to the administrator terminal 20. When the abnormality occurrence notification is received, the display control module 202 displays the administrator screen SC showing the possibility of abnormality occurring on the first server 30 after 5 minutes on the display unit 25.

The abnormality determination system 1 of Modification Example 1-6 executes abnormality determination with regard to an occurrence of abnormality in a future based on the performance index. This enables determination of a possibility of abnormality occurring in a future even though there is some time lag from a time when the performance index satisfies the abnormality determination criterion to a time when abnormality may actually occur. As a result, an occurrence of abnormality can be prevented by taking measures prescribed in a manual on the part of the administrator, or using a load balancer which automatically executes load balancing.

Modification Example 1-7

For example, a case in which the abnormality determination criterion including a threshold value to be compared to the performance index is used in the abnormality determination is taken as an example in the first embodiment. The abnormality determination, however, is not limited to the example of the first embodiment. The abnormality determination module 102 may execute the abnormality determination based on the performance index and a learning model that has learned a relationship between a performance index for training and an occurrence of abnormality. The learning model is a model trained with use of a method of machine learning.

Various publicly-known methods are usable for the method of machine learning itself. For example, the method of machine learning may be any of supervised learning, semi-supervised learning, and unsupervised learning. In Modification Example 1-7, a learning model using a neural network is taken as an example. For example, the administrator prepares training data that is pairs of an input part indicating the performance index for training and an output part indicating whether abnormality is occurring. The training data may be created manually by the administrator or may be created with use of a publicly-known tool.

A publicly-known method used in machine learning is usable for a method of learning the training data itself. For example, the administrator terminal 20 executes learning of the learning model by adjusting parameters of the learning model so that the output part of the training data is output when the input part of the training data is input. The administrator terminal 20 transmits the trained learning model to the abnormality determination server 10. The abnormality determination server 10 records the trained learning model received from the administrator terminal 20 in the data storage module 100.

For example, the abnormality determination module 102 inputs the performance index of a service to the learning model. The learning model calculates a feature amount of the performance index and, based on the feature amount, outputs a result of determination on whether abnormality has occurred. Processing executed by a learning model is sometimes called estimation, and a determination result output from the learning model can also be said as a result of estimation by the learning model. The determination result is not limited to binary values as those described in the first embodiment, and may be information having an intermediate value as is the case for the abnormality score. The abnormality determination module 102 executes the abnormality determination by acquiring the determination result output from the learning model.

The abnormality determination system 1 of Modification Example 1-7 executes the abnormality determination based on the performance index and the learning model that has learned a relationship between the performance index for training and an occurrence of abnormality. This enables execution of abnormality determination with the use of a method of machine learning, and accordingly raises the accuracy of abnormality determination.

Modification Example 1-8

For example, although the learning model described in Modification Example 1-7 may be prepared for each service separately, respective performance indices of the plurality of services may be learned in a comprehensive manner. A learning model in Modification Example 1-8 has learned a relationship between a performance index for training of each of the plurality of services and an occurrence of abnormality. A data structure itself of training data is the same as in Modification Example 1-7. However, an input part of the training data is a performance index for training of each of the plurality of services, instead of a performance index for training of one service.

The abnormality determination module 102 in Modification Example 1-8 executes the abnormality determination of at least one of the plurality of services based on the respective performance indices of the plurality of services and the learning model. For example, the abnormality determination module 102 executes, for each service, the abnormality determination of the service based on the performance index of the service, the performance indices of other services, and the learning model. Modification Example 1-8 differs from Modification Example 1-7 in that the performance indices of the plurality of services instead of the performance index of one service are input to the learning model, but is the same as Modification Example 1-7 with regard to the rest.

The abnormality determination system 1 of Modification Example 1-8 executes the abnormality determination of at least one of the plurality of services based on the respective performance indices of the plurality of services and the learning model. This enables execution of abnormality determination that takes respective performance indices of the plurality of services into consideration in a comprehensive manner, and accordingly raises the accuracy of abnormality determination.

Modification Example 1-9

For example, the service providing system 2 may undergo renewal in stages. In this case, an old system which is the relatively old service providing system 2 and a new system which is the relatively new service providing system 2 may coexist. The old system and the new system differ from each other in at least one of hardware or software used to provide a service. Then the abnormality determination of the new system may be executed based on the performance index of the old system.

For example, when a user uses a service on a browser, the user can access any of a URL of the old system and a URL of the new system. In a case in which the user uses an application other than a browser, the user can access any of an application of the old system and an application of the new system. In Modification Example 1-9, there are the service providing system 2 that is the old system and the service providing system 2 that is the new system, that is, two service providing systems 2.

The performance index acquisition module 101A in Modification Example 1-9 acquires an old system index which is the performance index based on the old system and a new system index which is the performance index based on the new system. For example, the performance index acquisition module 101A acquires the old system index from the old system. The old system index differs from the performance index described in the first embodiment in that the old system index is a performance index based on the old system, but is the same with regard to the rest. The old system index can accordingly be the various performance indices described in the first embodiment.

For example, the performance index acquisition module 101A acquires the new system index from the new system. The new system index differs from the performance index described in the first embodiment in that the new system index is a performance index based on the new system, but is the same with regard to the rest. The old system index can accordingly be the various performance indices described in the first embodiment.

The abnormality determination module 102 in Modification Example 1-9 executes the abnormality determination of the new system based on the old system index which is a performance index based on the old system. For example, when the old system index satisfies the determination criterion, the abnormality abnormality determination module 102 determines that abnormality is occurring in the new system. The abnormality determination criterion here may be the old system index being equal to or more than a threshold value. The old system index being equal to or more than a threshold value implies that users are preferentially using the old system instead of the new system, and there is a possibility that some abnormality is consequently occurring in the new system. The abnormality determination module 102 accordingly determines that there is abnormality in the new system when the old system index is equal to or more than the threshold value.

The abnormality determination system 1 of Modification Example 1-9 executes the abnormality determination of the new system based on the old system index which is a performance index based on the old system. This raises the accuracy of the abnormality determination of the new system. Abnormality that is unidentifiable with the performance index based on the new system alone can be identified.

Modification Example 1-10

For example, in the first embodiment, a payment index is described as an example of the performance index. It is sufficient for the performance index to be information indicating some performance of a service, and the performance index is not limited to a payment index. For example, the performance index acquisition module 101A acquires, as the performance index, a transaction index about transactions in an electronic commerce transaction service. A transaction is utilization of the electronic commerce transaction service, for example, purchase of an article of commerce or content. The transaction index is the number of pieces purchased, a purchase amount, a sum of purchase amounts, an article of commerce added to a shopping cart, a cart abandonment count, or an article of commerce added to a bookmark, or a combination thereof.

The abnormality determination module 102 in Modification Example 1-10 executes the abnormality determination based on the transaction index. Modification Example 1-10 differs from the first embodiment in that the transaction index is used in the abnormality determination, but is as described in the first embodiment with regard to the rest.

The abnormality determination system 1 of Modification Example 1-10 executes the abnormality determination based on the transaction system. This raises the accuracy of abnormality determination in an electronic commerce transaction service.

Modification Example 1-11

For example, the performance index acquisition module 101A may acquire, as the performance index, a membership index about membership of a service. The membership index is an index about members of the service. For example, the membership index is the number of members, an amount of change in the number of members, a membership withdrawal count, or an amount of change in membership withdrawal count, or a combination thereof.

The abnormality determination module 102 executes the abnormality determination based on the membership index. Modification Example 1-11 differs from the first embodiment in that the membership index is used abnormality determination, but is as described in the first embodiment with regard to the rest.

The abnormality determination system 1 of Modification Example 1-11 executes the abnormality determination based on the membership index. This enables the accuracy of abnormality determination in a service that requires membership registration.

3-2. Modification Examples Concerning Second Embodiment

Modification examples concerning the second embodiment are described next.

Modification Example 2-1

For example, a case in which the plan data indicates a campaign time is described in the second embodiment. However, it is sufficient for the plan data to indicate some form of plan in the service providing system 1, and the plan data is not limited to the campaign time. In Modification Example 2-1, a case in which the plan data indicates a maintenance time for performing maintenance with regard to the service is taken as an example.

The maintenance is performed on hardware and software included in the service providing system 2. For example, inspection, replacement, removal, or addition of hardware, or a combination thereof corresponds to the maintenance. Inspection, installation, or uninstallation of software, or a combination thereof corresponds to the maintenance. The maintenance time is a period in which the maintenance is performed. The maintenance time may be expressed by a date and a time or by a date alone, as is the case for the campaign time.

The abnormality determination module 102 in Modification Example 2-1 executes the abnormality determination based on the performance index and the maintenance time indicated by the plan data. For example, the abnormality determination module 102 determines whether the current time is included in the maintenance time. The abnormality determination module 102 does not execute the abnormality determination based on the performance index when the current time is included in the maintenance time, and executes the abnormality determination based on the performance index when the current time is not included in the maintenance time.

The abnormality determination system 1 of Modification Example 2-1 executes the abnormality determination based on the performance index and the maintenance time indicated by the plan data. This enables abnormality determination fit to the maintenance time, and accordingly enhances the flexibility of the abnormality determination. For instance, transmission of needless abnormality determination notification to the administrator is preventable by not determining that there is abnormality when the performance index drops due to the maintenance.

Modification Example 2-2

For example, a case in which whether to execute the abnormality determination is determined based on the maintenance time is described in Modification Example 2-1. However, the abnormality determination using the maintenance time is not limited to the example of Modification Example 2-1. The abnormality determination module 102 in Modification Example 2-2 determines the abnormality determination criterion about the abnormality determination based on the plan data. The abnormality determination module 102 executes the abnormality determination based on the determined abnormality determination criterion and an index.

For example, the abnormality determination module 102 may determine an abnormality determination criterion based on the maintenance time that is indicated by the plan data, and execute the abnormality determination based on the performance index and the determined abnormality determination criterion. When the current time is included in the maintenance time, the abnormality determination module 102 sets a threshold value indicated by the abnormality determination criterion lower than when the current time is not included in the maintenance time. The abnormality determination module 102 executes the abnormality determination based on the performance index and the lowered threshold value.

Although a case in which the plan data indicates a maintenance time is taken as an example in Modification Example 2-2, the abnormality determination module 102 may similarly determine the abnormality determination criterion based on a campaign time in a case in which the plan data indicates a campaign time. This processing may be executed by the same method that is described in the second embodiment.

The abnormality determination system 1 of Modification Example 2-2 determines the abnormality determination criterion about abnormality determination based on the plan data, and executes the abnormality determination based on the determined abnormality determination criterion and an index. This enables the use of the abnormality determination criterion fit to a plan, and accordingly raises the accuracy of abnormality determination.

Modification Example 2-3

For example, when the abnormality determination criterion is dynamically determined as in Modification Example 2-2, the abnormality determination module 102 may determine the abnormality determination criterion based on a relationship between a condition about the plan data and an abnormality determination criterion used when the condition is satisfied. This relationship is set in the abnormality determination criterion database DB3. The condition about the plan data is a condition determined based on information that is included in the plan data.

For example, a condition about a campaign time, duration of a campaign, an amount of money of the campaign, a user base that is a target of the campaign, the number of users expected to participate in the campaign, or an expected value of the performance index during the campaign, or a combination thereof corresponds to the condition about the plan data. For example, a maintenance time, duration of maintenance, a service on which maintenance is to be performed, hardware on which maintenance is to be performed, or software on which maintenance is to be performed, or a combination thereof corresponds to the condition about the plan data.

For example, for each condition about the plan data, an abnormality determination criterion to be applied when the condition is satisfied is defined in the abnormality determination criterion database DB3 in Modification Example 2-3. As an example of the condition, the amount of money of the campaign may be defined. For example, the abnormality determination criterion database DB3 is created so that the abnormality determination criterion is higher when the amount of money of the campaign is larger. For example, the abnormality determination module 102 determines, for each condition, whether the condition is satisfied based on the plan data. The abnormality determination module 102 identifies the abnormality determination criterion that is associated with the condition determined to be satisfied. The abnormality determination module 102 executes the abnormality determination based on the performance index and the identified abnormality determination criterion.

The abnormality determination system 1 of Modification Example 2-3 determines the abnormality determination criterion based on a relationship between a condition about the plan data and an abnormality determination criterion used when the condition is satisfied. This enables use of an optimum abnormality determination criterion fit to the plan data, and accordingly raises the accuracy of abnormality determination.

Modification Example 2-4

For example, a case in which the abnormality determination criterion is determined with use of the abnormality determination criterion database DB3 is described in Modification Example 2-3. However, the method of determining the abnormality determination criterion is not limited to the example described in Modification Example 2-3. The abnormality determination module 102 may determine the abnormality determination criterion based on the plan data and a learning model that has learned a relationship between plan data for training and the abnormality determination criterion. This learning model differs from the learning model described in Modification Example 1-7.

Various publicly-known methods are usable for a method of machine learning itself. For example, the method of machine learning may be any of supervised learning, semi-supervised learning, and unsupervised learning. In Modification Example 2-4, a learning model using a neural network is taken as an example. For example, the administrator prepares training data that is pairs of an input part indicating a plan for training and an output part indicating an abnormality determination criterion deemed to be optimum. The training data may be created manually by the administrator or may be created with use of a publicly-known tool.

A publicly-known method used in machine learning is usable for a method of learning the training data itself. For example, the administrator terminal 20 executes learning of the learning model by adjusting parameters of the learning model so that the output part of the training data is output when the input part of the training data is input. The administrator terminal 20 transmits the trained learning model to the abnormality determination server 10. The abnormality determination server 10) the trained learning model received from the administrator terminal 20 in the data storage module.

For example, the abnormality determination module 102 inputs the plan data to the learning model. The learning model calculates a feature amount of a plan indicated by the plan data, and outputs an abnormality determination criterion suitable for the feature amount. The abnormality determination module 102 executes the abnormality determination based on the performance index and the abnormality determination criterion output from the learning model. The method of acquiring the abnormality determination criterion differs from the acquisition method in the second embodiment, but the abnormality determination using the abnormality determination criterion may be the same as in the second embodiment. For example, the learning model outputs the abnormality determination criterion so that a threshold value included in the abnormality determination criterion is higher when impact (for example, an amount of increase of the payment amount) of the campaign in the plan indicated by the plan data is greater. For another element that is included in the plan data and that has a correlation with an abnormality determination criterion, the learning model outputs the abnormality determination criterion associated with the another element.

The abnormality determination system 1 of Modification Example 2-4 determines the abnormality determination criterion based on the plan data and the learning model that has learned a relationship between the plan data for training and the abnormality determination criterion. This optimizes the abnormality determination criterion with the use of the method of machine learning, and accordingly raises the accuracy of abnormality determination.

Modification Example 2-5

For example, a learning model in Modification Example 2-5 may have learned a relationship based on past performance. The relationship based on past performance is a relationship between an actual performance index in a past and an abnormality determination criterion deemed to be optimum for that time. For example, training data in Modification Example 2-5 is manually created by the administrator based on the past performance. The training data in Modification Example 2-5 may also be created automatically with the use of a publicly-known tool.

The abnormality determination module 102 in Modification Example 2-5 determines the abnormality determination criterion based on the learning model that has learned the relationship based on the past performance. Modification Example 2-5 differs from Modification Example 2-4 in that the learning model has learned the relationship based on the past performance, but is the same as Modification Example 2-4 with regard to the rest. For example, the learning model in Modification Example 2-5 has learned a relationship between an element included in plan data of a past plan and an abnormality determination criterion deemed to be optimum by taking an actual performance index of that time into consideration. The learning model receives input of plan data of a future plan and outputs an abnormality determination criterion suitable for the plan data.

The abnormality determination system 1 of Modification Example 2-5 determines the abnormality determination criterion based on the learning model that has learned a relationship based on past performance. This optimizes the abnormality determination criterion with the use of the method of machine learning, and accordingly raises the accuracy of abnormality determination.

Modification Example 2-6

For example, by combining Modification Example 1-7 of the first embodiment and the second embodiment, the abnormality determination module may execute the abnormality 102 determination based on the performance index and the learning model that has learned a relationship between an index for training and an abnormality determination result about an occurrence of abnormality. This processing is as described in Modification Example 1-7.

The abnormality determination system 1 of Modification Example 2-6 executes the abnormality determination based on the performance index and the learning model that has learned a relationship between the index for training and an abnormality determination result about an occurrence of abnormality. This enables execution of the abnormality determination with the use of a method of machine learning, and accordingly raises the accuracy of abnormality determination.

Modification Example 2-7

For example, the learning model in Modification Example 2-6 may have learned a relationship based on past performance, as is the case for the learning model in Modification Example 2-5. The relationship based on past performance is a relationship between an actual performance index in a past and presence or absence of abnormality at that time. For example, training data in Modification Example 2-6 is manually created by the administrator based on the past performance. The training data in Modification Example 2-6 may also be created automatically with the use of a publicly-known tool.

The abnormality determination module 102 executes the abnormality determination based on the learning model that has learned the relationship on based past performance. Modification Example 2-7 differs from Modification Example 2-6 in that the learning model has learned the relationship based on past performance, but is the same as Modification Example 2-6 with regard to the rest.

In the abnormality determination system 1 of Modification Example 2-7, the abnormality determination module 102 executes the abnormality determination based on the learning model that has learned the relationship based on past performance. This enables execution of the abnormality determination with the use of a method of machine learning, and accordingly raises the accuracy of abnormality determination.

Modification Example 2-8

For example, a campaign of the first service is taken as an example in the second embodiment. The plan data acquisition module 103, however, may acquire respective plans of a plurality of services. In Modification Example 2-8, pieces of plan data indicating respective plans of the plurality of services are stored in the plan database DB2. The individual pieces of plan data are as described in the second embodiment.

The abnormality determination module 102 in Modification Example 2-8 executes the abnormality determination of at least one of the plurality of services based on respective performance indices of the plurality of services and respective plans of the plurality of services. For example, the abnormality determination module 102 executes, for each service, the abnormality determination service based on the performance index of the service and the plan of the service. For example, the abnormality determination module 102 executes, for each service, the abnormality determination of the service based on the performance index of the service, the performance indices of other services, the plan of the service, and the plans of other services.

The abnormality determination system 1 of Modification Example 2-8 executes the abnormality determination of at least one of a plurality of services based on respective indices of the plurality of services and respective plans of the plurality of services. This enables execution of the abnormality determination of at least one service even when the service providing system 1 provides a plurality of services. For example, in a case of executing the abnormality determination of the first service based on the performance index of the first service and the plan of the first service, abnormality determination that takes the plan of the first service into consideration as well can be executed, and the accuracy of abnormality determination is accordingly raised. In a case of executing the abnormality determination of the first service based on the respective performance indices of the first service and the second service and the respective plans of the first service and the second service, abnormality determination that takes not only the plan of the first service but also the plan of the second service into consideration can be executed, and the accuracy of abnormality determination is accordingly raised.

Modification Example 2-9

For example, by combining Modification Example 1-1 of the first embodiment and the second embodiment, the abnormality determination module 102 may execute the abnormality determination for each service that is a target of the abnormality determination, based on a relationship between the performance index and the plan of the service and the overall performance index and plan of the plurality of services. The overall performance index of the plurality of services is as described in Modification Example 1-1. The overall plan of the plurality of services is a plan common to the plurality of services.

For example, maintenance of the shared server 60 concerns all services, and accordingly corresponds to the overall plan of the plurality of services. The abnormality determination module 102 does not execute the abnormality determination when overall maintenance of the plurality of services takes place. A campaign of reward points usable in all of the plurality of services concerns all services, and accordingly corresponds to the overall plan of the plurality of services. The abnormality determination module 102 raises the abnormality determination criterion on the whole when a cross-service campaign involving the plurality of services is run.

The abnormality determination system 1 of Modification Example 2-9 executes the abnormality determination for each service that is a target of the abnormality determination, based on a relationship between the performance index and the plan of the service and the overall performance index and plan of the plurality of services. This enables execution of abnormality determination that takes an overall plan of a plurality of services into consideration, and accordingly raises the accuracy of abnormality determination. For instance, abnormality determination that takes a plan common to a plurality of services instead of a plan unique to an individual service into consideration can be executed.

Modification Example 2-10

For example, by combining Modification Example 1-2 of the first embodiment and the second embodiment, the abnormality determination module 102 may execute the abnormality determination for each service that is a target of the abnormality determination, based on a relationship between the performance index and a plan of the service and the performance index and a plan of another service. The performance index of the another service is as described in Modification Example 1-2. For example, the abnormality determination module 102 determines the abnormality determination criterion of the second service based on the plan of the second service and the plan of the third service because the second service and the third service are both fintech-based services in the example of the embodiments. The abnormality determination module 102 may execute the abnormality determination of the second service by determining whether the performance index of the second service and the performance index of the third service satisfy the thus determined abnormality determination criterion of the second service.

In the abnormality determination system 1 of Modification Example 2-10, the abnormality determination module 102 executes the abnormality determination for each service that is a target of the abnormality determination, based on a relationship between the index and a plan of the service and the index and a plan of another service.

3-3. Other Modification Examples Common to First Embodiment and Second Embodiment For example, the modification examples described above may be combined.

For instance, although a case of executing main processing on the abnormality determination server 10 is described in the first embodiment and the second embodiment, the processing described as processing to be executed on the abnormality determination server 10 may be executed on the administrator terminal 20 or another computer, or may be distributed among a plurality of computers.

The invention claimed is:

1. An abnormality determination system, comprising at least one processor configured to:
   acquire an index usable in an abnormality determination about an occurrence of an abnormality in a service providing system for providing a predetermined service;
   acquire plan data about a plan of the predetermined service, the plan data indicating a campaign time in which a campaign related to the predetermined service is run;
   determine an abnormality determination criterion about the abnormality determination based on the plan data;

adjust the abnormality criterion during the campaign time based on the plan data; and execute the abnormality determination based on the index and the abnormality determination criterion in real time;

wherein the service providing system is a system for concurrently providing a plurality of services each of which is the predetermined service, wherein the at least one processor is configured to:

acquire the index of each of the plurality of services, acquire the plan data of each of the plurality of services, determine the abnormality determination criterion based on the plan data for each of the plurality of services, wherein the abnormality determination criterion for each of the plurality of services are not the same;

acquire the plan data indicating the campaign time for at least one of the plurality of services;

adjust the abnormality criterion for the at least one of the plurality of services during the campaign time for the at least one of the plurality of services based on the plan data for the at least one of the plurality of services; and execute the abnormality determination of each of the plurality of services based on the index of each of the plurality of services, and the plan data of each of the plurality of services in real time.

2. The abnormality determination system according to claim 1, wherein the plan data indicates a maintenance time in which maintenance related to the predetermined service is performed, and wherein the at least one processor is configured to execute the abnormality determination based on the index and the maintenance time indicated by the plan data.

3. The abnormality determination system according to claim 1, wherein the at least one processor is configured to determine the abnormality determination criterion based on a relationship between a condition about the plan data and the abnormality determination criterion used when the condition is satisfied.

4. The abnormality determination system according to claim 1, wherein the at least one processor is configured to determine the abnormality determination criterion based on the plan data and a learning model that has learned a relationship between the plan data for training and the abnormality determination criterion.

5. The abnormality determination system according to claim 4, wherein the at least one processor is configured to determine the abnormality determination criterion based on the learning model that has learned the relationship based on past performance.

6. The abnormality determination system according to claim 4, wherein the at least one processor is configured to execute the abnormality determination based on the index and a learning model that has learned a relationship between the index for training and an abnormality determination result about the occurrence of the abnormality.

7. The abnormality determination system according to claim 6, wherein the at least one processor is configured to execute the abnormality determination based on the learning model that has learned the relationship based on past performance.

8. The abnormality determination system according to claim 1, wherein the at least one processor is configured to execute the abnormality determination for each of the plurality of services that is a target of the abnormality determination, based on a relationship between the index and the plan of the each of the plurality of services and an overall index and plan of the plurality of services.

9. The abnormality determination system according to claim 1, wherein the at least one processor is configured to execute the abnormality determination for each of the plurality of services that is a target of the abnormality determination, based on a relationship between the index and the plan of the each of the plurality of services and the index and the plan of another of the plurality of services.

10. The abnormality determination system according to claim 1, wherein the index is selected from among a number of payment transactions, a payment amount, a number of orders, a number of uses, a number of new users, a number of active users, an access count, and a login count.

11. An abnormality determination method, comprising:

acquiring an index usable in an abnormality determination about an occurrence of an abnormality in a service providing system for providing a predetermined service;

acquiring plan data about a plan of the predetermined service, the plan data indicating a campaign time in which a campaign related to the predetermined service is run;

determining an abnormality determination criterion about the abnormality determination based on the plan data;

adjusting the abnormality criterion during the campaign time based on the plan data; and executing the abnormality determination based on the index and the abnormality determination criterion in real time;

wherein the service providing system is a system for concurrently providing a plurality of services each of which is the predetermined service, wherein the method comprises:

acquiring the index of each of the plurality of services, acquiring the plan data of each of the plurality of services, determining the abnormality determination criterion based on the plan data for each of the plurality of services, wherein the abnormality determination criterion for each of the plurality of services are not the same;

acquiring the plan data indicating campaign time for at least one of the plurality of services;

adjusting the abnormality criterion for the at least one of the plurality of services during the campaign time for the at least one of the plurality of services based on the plan data for the at least one of the plurality of services; and executing the abnormality determination of each of the plurality of services based on the index of each of the plurality of services, and the plan data of each of the plurality of services in real time.

12. A non-transitory computer-readable information storage medium for storing a program for causing a computer to:

acquire an index usable in an abnormality determination about an occurrence of an abnormality in a service providing system for providing a predetermined service;

acquire plan data about a plan of the predetermined service, the plan data indicating a campaign time in which a campaign related to the predetermined service is run;

determine an abnormality determination criterion about the abnormality determination based on the plan data;

adjust the abnormality criterion during the campaign time based on the plan data; and execute the abnormality determination based on the index and the abnormality determination criterion in real time;

wherein the service providing system is a system for concurrently providing a plurality of services each of which is the predetermined service, wherein the program causes the computer to:

acquire the index of each of the plurality of services, acquire the plan data of each of the plurality of services, determine the abnormality determination criterion based on the plan data for each of the plurality of services, wherein the abnormality determination criterion for each of the plurality of services are not the same;

acquire the plan data indicating the campaign time for at least one of the plurality of services;

adjust the abnormality criterion for the at least one of the plurality of services during the campaign time for the at least one of the plurality of services based on the plan data for the at least one of the plurality of services; and execute the abnormality determination of each of the plurality of services based on the index of each of the plurality of services, and the plan data of each of the plurality of services in real time.

\* \* \* \* \*